(12) United States Patent
Feucht et al.

(10) Patent No.: US 11,458,763 B2
(45) Date of Patent: Oct. 4, 2022

(54) RIM WITH RECESSED CHANNEL AND RIM STRIP APPARATUS AND SYSTEM

(71) Applicants: Christian Feucht, Nevada City, CA (US); Mark Slate, San Rafael, CA (US); Evan Smith, Nevada City, CA (US); Raphael Schlanger, Wilton, CT (US); Patrick M. Seidler, Mill Valley, CA (US)

(72) Inventors: Christian Feucht, Nevada City, CA (US); Mark Slate, San Rafael, CA (US); Evan Smith, Nevada City, CA (US); Raphael Schlanger, Wilton, CT (US); Patrick M. Seidler, Mill Valley, CA (US)

( * ) Notice: Subject to any disclaimer, the term of this patent is extended or adjusted under 35 U.S.C. 154(b) by 602 days.

(21) Appl. No.: 16/329,351

(22) PCT Filed: Aug. 28, 2017

(86) PCT No.: PCT/US2017/048863
§ 371 (c)(1),
(2) Date: Feb. 28, 2019

(87) PCT Pub. No.: WO2018/044773
PCT Pub. Date: Mar. 8, 2018

(65) Prior Publication Data
US 2019/0217660 A1 Jul. 18, 2019

Related U.S. Application Data

(60) Provisional application No. 62/380,710, filed on Aug. 29, 2016.

(51) Int. Cl.
*B60B 21/12* (2006.01)
*B60B 1/00* (2006.01)
(Continued)

(52) U.S. Cl.
CPC .............. *B60B 21/12* (2013.01); *B60B 1/003* (2013.01); *B60B 1/02* (2013.01); *B60B 21/025* (2013.01);
(Continued)

(58) Field of Classification Search
CPC ..... B60B 21/12; B60B 21/025; B60B 21/104; B60B 1/003; B60B 1/02; B60B 2310/318; B60B 2900/5116
See application file for complete search history.

(56) References Cited

U.S. PATENT DOCUMENTS 3,008,770 A    11/1961  Mueller
4,602,665 A *  7/1986  Sacks ..................... B60B 21/12
                                                    301/95.101

(Continued)

FOREIGN PATENT DOCUMENTS

DE   102007023220 A1 * 11/2008 ............. B60B 21/12
EP       0240241 A2 * 10/1987 ............. B60B 21/12
FR       2426579 A1 * 12/1979 ............. B60B 21/12

OTHER PUBLICATIONS

Machine translation of FR 2426579 A1, 6 pages (Year: 1979).*
(Continued)

*Primary Examiner* — Jason R Bellinger
*Assistant Examiner* — Emily G. Castonguay
(74) *Attorney, Agent, or Firm* — Michael A. Blake

(57) ABSTRACT

A rim sealing strip comprising: a circumferentially elongated rim strip having a radially outwardly facing outboard surface, a radially inwardly facing inboard surface, a first lateral edge and a second lateral edge laterally spaced from the first lateral edge; where the rim strip includes an overall lateral width between the first lateral edge and the second lateral edge and a radial thickness between the outboard (Continued)

surface and the inboard surface; and where the radial thickness is variable across the lateral width to include a first lateral region having a first radial thickness and a second lateral region having a second radial thickness, where the first radial thickness is thicker than the second radial thickness. A rim sealing system comprising: a circumferentially elongated rim strip having a radially outwardly facing outboard surface, a radially inwardly facing inboard surface, a first lateral edge and a second lateral edge laterally spaced from the first lateral edge; a rim to receive the circumferentially elongated rim strip, where the rim includes a radially outwardly projecting first bead flange, a radially outwardly projecting second bead flange laterally spaced from the first bead flange, and a radially outwardly facing tire bed surface positioned laterally between the first bead flange and the second bead flange, and where the inboard surface of the rim strip circumscribes the tire bed surface; where the rim strip includes an overall lateral width between the first lateral edge and the second lateral edge and a radial thickness between the outboard surface and the inboard surface; and where the radial thickness is variable across the lateral width to include a first lateral region having a first radial thickness and a second lateral region having a second radial thickness, where the first radial thickness is thicker than the second radial thickness. A rim sealing strip comprising: a circumferentially elongated rim strip having a radially outwardly facing outboard surface, a radially inwardly facing inboard surface, a first lateral edge and a second lateral edge laterally spaced from the first lateral edge; where the rim strip includes an overall lateral width between the first lateral edge and the second lateral edge and a radial thickness between the outboard surface and the inboard surface; and where the rim strip includes a first lateral region and a second lateral region laterally adjoining the first lateral region; and where the material stiffness of the first lateral region has greater stiffness than the material stiffness of the second lateral region. A rim comprising: a rim, the rim comprising: a radially outwardly facing tire bed surface along a circumference of the rim; and channel laterally positioned generally in the center of the tire bed surface and along the entire circumference; where the tire bed surface includes an unsealed opening there through to communicate to the atmosphere; and where the channel has a lateral width that completely laterally overlaps the opening. A rim system comprising: a rim, the rim comprising: a tire bed surface along a circumference of the rim; a channel generally in the center of the inner surface and generally along the entire circumference; a rim strip configured to be removeably seated in the channel; and rim tape configured to adhere to the tire bed surface and the rim strip. An air barrier for a tubeless rim, the air barrier comprising: a rim strip configured to be removeably seated in a center channel located on a tire bed surface along a circumference of a tubeless rim; and rim tape configured to adhere to the inner surface and the rim strip. A rim sealing strip comprising: a circumferentially elongated rim strip having a radially outwardly facing outboard surface, a radially inwardly facing inboard surface, a first lateral edge and a second lateral edge laterally spaced from the first lateral edge; where the rim strip includes an overall lateral width between the first lateral edge and the second lateral edge and a radial thickness between the outboard surface and the inboard surface; and where the rim strip includes a first lateral region and a second lateral region laterally adjoining the first lateral region; and where at least one of: (i) the radial thickness is variable across the lateral width to include a first lateral region having a first radial thickness and a second lateral region having a second radial thickness, where the first radial thickness is thicker than the second radial thickness; and (ii) the material stiffness of the first lateral region is greater than the material stiffness of the second lateral region.

53 Claims, 13 Drawing Sheets

(51) Int. Cl.
B60B 1/02 (2006.01)
B60B 21/02 (2006.01)
B60B 21/10 (2006.01)

(52) U.S. Cl.
CPC ...... *B60B 21/104* (2013.01); *B60B 2310/318* (2013.01); *B60B 2900/5116* (2013.01)

(56) References Cited

U.S. PATENT DOCUMENTS

| | | | |
|---|---|---|---|
| 6,155,651 A | 12/2000 | Mizata | |
| 6,237,662 B1 | 5/2001 | Thomasberg | |
| 9,067,465 B2* | 6/2015 | Erler | B60B 21/04 |
| 2004/0095014 A1 | 5/2004 | Veux | |
| 2007/0029869 A1* | 2/2007 | Senoo | B60B 21/026 |
| | | | 301/95.104 |
| 2011/0181100 A1* | 7/2011 | Abad | B60B 1/041 |
| | | | 301/95.101 |
| 2011/0266863 A1 | 11/2011 | Gittani | |
| 2015/0054333 A1* | 2/2015 | Chen | B60B 21/062 |
| | | | 301/95.102 |

OTHER PUBLICATIONS

International Search Report for PCT/US2017/048863, dated Dec. 27, 2017, Lee W. Young.
"Quick and Easy Tubeless Set Up for a Fat Bike" (Fatbike Brigade 30 Aug. 2014, https//fatbikebrigade.com/2014/08/30/quick-and-easy-tubeless-set-up-for-a-fat-bike/, p. 1-4.

* cited by examiner

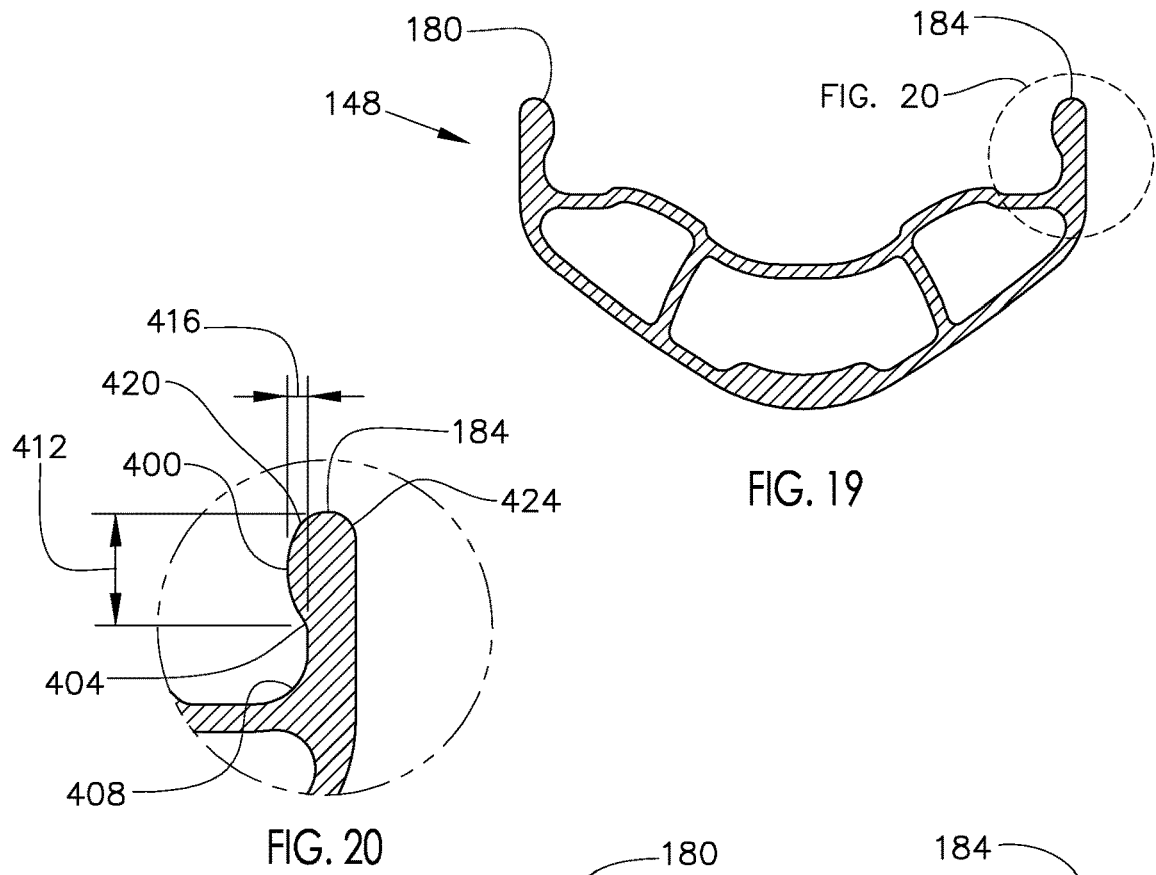
FIG. 19
FIG. 20
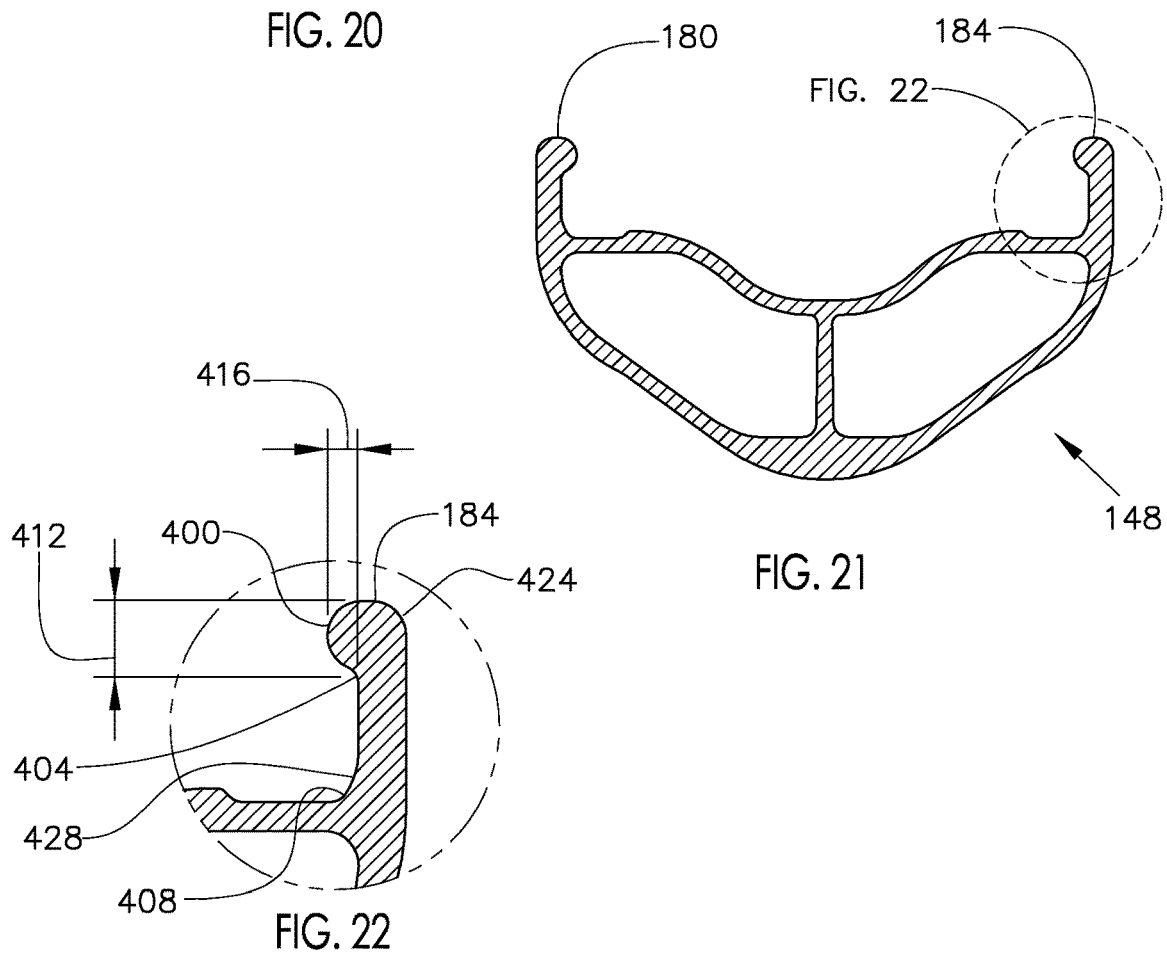
FIG. 21
FIG. 22

RIM WITH RECESSED CHANNEL AND RIM STRIP APPARATUS AND SYSTEM

CROSS-REFERENCES

This patent application claims the benefit of International Patent Application No. PCT/US2017/48863 by inventors Christian Feucht, Mark Slate, Evan Smith, Raphael Schlanger, and Patrick M. Seidler entitled "RIM WITH RECESSED CHANNEL AND RIM STRIP APPARATUS AND SYSTEM," filed on Aug. 28, 2017, and which International Patent Application is fully incorporated by reference herein. International Patent Application No. PCT/US2017/48863 claims the benefit of U.S. Provisional Patent Application No. 62/380,710 by inventors Christian Feucht, Mark Slate, Evan Smith, and Raphael Schlanger entitled "RIM WITH RECESSED CHANNEL AND RIM STRIP APPARATUS AND SYSTEM," filed on Aug. 29, 2016, and which provisional application is fully incorporated by reference herein.

TECHNICAL FIELD

The present invention relates to a rim configured to attach to a tire, and more specifically to an apparatus and system comprising a rim sealing strip with a reinforced portion and a rim with a recessed channel to receive the rim sealing strip.

BACKGROUND

Traditional bicycle tubeless tire applications commonly require the use of rim sealing tape to provide an airtight pneumatic seal between the tire beads. Most often the airtight pneumatic seal between the tire beads, rim sealing tape, and tire is enhanced with the use of sealant. This rim sealing tape is commonly made from tensilized polypropylene (TPP). This TPP rim tape tends to be quite fragile in the circumferential length direction, while being somewhat more durable in the lateral width direction, making the tape difficult to install. The current trend towards wider rims has also made installation of this type of tape even more difficult. The TPP rim tape has very low resistance to piercing such that, when a spoke breaks, the remaining spoke nipple is commonly ejected radially outwardly with enough force to pierce the tape. Further, this rim tape has relatively low cut and abrasion resistance such that, over time and due to tire pressure, the sharp edge of the spoke access holes can cut through the tape. Still further, this rim tape can become ruptured and/or herniated at the spoke access hole due to higher tire pressures and/or due to tire installation and removal, which may cause the tire to lose air through the tape at the spoke access holes.

Rim sealing tape must have a wide range of desirable characteristics to function properly. These characteristics include high strength, tear resistance, rupture resistance and abrasion resistance to prevent damage during installation and use. It must also be stiff enough to bridge across openings (such as the spoke access holes) without distorting appreciably. The rim tape must also provide a smooth sealing surface that spans laterally across the tire bed of the rim to have a sealing interface with the two laterally spaced tire beads. As such, it must also be soft, ductile, flexible, and pliable to conform to the complex contour of the tire bed surface to provide a predictable and accurate tire interface contour to reliably mate and seal with the tubeless tire. It may be preferable that the resulting tire interface contour be in conformance with the European Tyre and Rim Technical Organisation (ETRTO) specifications for tubeless tires 2017, which are designated as ETRTO 27.4 and ETRTO 28.2 (at the time of this writing). A copy of the ETRTO specification is attached as Appendix A.

Heretofore, conventional rim sealing tape is generally supplied as spool of continuous tape that is of a single material, such as TPP, and has a generally constant width and thickness. This tape commonly includes an adhesive on one face. This tape is wrapped circumferentially around the exterior of the tire bed wall, with the two ends circumferentially overlapping each other.

One problem with this conventional tape is that these several desirable characteristics commonly tend to be mutually exclusive. In other words, all of these characteristics are difficult, if not impossible, to achieve in a rim tape of singular material and having a single lateral width and a single radial thickness. For example, to have the requisite characteristic of flexibility, ductility, and easy conformability, the tape is not likely to also have high strength, stiffness, pierce resistance, etc. If the user attempts to ameliorate this lack of strength, stiffness, pierce resistance, etc. by continuously wrapping the tape in multiple layers, then the resulting tire interface contour will have excessive buildup and also be inaccurate and unpredictable. The tire will thus be difficult, if not impossible, to install and the resulting sealing interface with the tire will be inaccurate and unreliable. The additional tape material also adds excessive weight to the system.

Conversely, if the tape has the requisite properties of stiffness, strength, pierce and cut resistance, etc., then it is commonly too rigid and non-pliable to have sufficient conformability during installation to accurately achieve the desired tire interface contour. The end result also makes the tire difficult or impossible to install and makes the tire sealing interface unreliable.

Further, through the course of normal wear and tear where the tape covers spoke access holes, the tape becomes degraded for air retention, both by the force of the air on the tape and by taking tires on and off the rim among other things. So, over time, the tape does not retain air as well as it should in the spoke access hole area. This is particularly true when high pressure tires are utilized.

Traditionally, tubeless-ready bicycle rims require the use of a tough and airproof tape to seal the inside of the rim, over the spoke access holes, to make the air chamber airtight. Most often the rim, rim tape, and tire are used with a liquid sealant to allow the tires to remain inflated. The tape may be a tensilized polypropylene (TPP) or a similar very durable and strong airproof tape. The drawback of current tubeless bicycle tires is, the nature of the standard rim tape makes it very difficult to install, and while durable in the width direction, it is actually quite fragile in the length direction. In the recent bicycle market there is a trend towards wider rims, which has also made installation of this type of tape even more difficult.

The fragile nature of the current TPP tape in the linear (i.e. circumferential) direction can also be problematic when a spoke breaks in the wheel during use. At these times, the broken end of the spoke, with the nipple on it, can pierce through the rim tape causing an instantaneous flat tire.

Options other than using TPP tape include the use of plugs inserted into the spoke holes underneath the tape (not common) or the use of thicker tape with cross-fiber reinforcement, such as Gorilla Tape™. The spoke hole plug system makes tape installation even more difficult, and it also makes tire installation more difficult by effectively increasing the diameter of the external tire bed surface. Also, the plugs may easily fall out and become lost. Once one plug is missing, the entire system will be compromised due to loss of air pressure at the spoke access hole. Due to its excessive tape thickness, the cross-fiber reinforced tape solution increases the bead seat diameter making tire installation and removal more difficult, plus the thicker; conforming-nature of this type of tape can make tire removal almost impossible on some properly sized rims.

Previously, manufactures thought that a step or hook shaped rim bead flange was necessary to hold a tire bead in the rim. However, it has been discovered that the step or hook shape of the rim bead flanges lead to leaking in tubeless tires.

Thus there is a need for a rim apparatus and system that overcomes the above listed and other disadvantages.

SUMMARY OF THE INVENTION

The invention relates to a rim sealing strip comprising: a circumferentially elongated rim strip having a radially outwardly facing outboard surface, a radially inwardly facing inboard surface, a first lateral edge and a second lateral edge laterally spaced from the first lateral edge; where the rim strip includes an overall lateral width between the first lateral edge and the second lateral edge and a radial thickness between the outboard surface and the inboard surface; and where the radial thickness is variable across the lateral width to include a first lateral region having a first radial thickness and a second lateral region having a second radial thickness, where the first radial thickness is thicker than the second radial thickness.

The invention also relates to a rim sealing system comprising: a circumferentially elongated rim strip having a radially outwardly facing outboard surface, a radially inwardly facing inboard surface, a first lateral edge and a second lateral edge laterally spaced from the first lateral edge; a rim to receive the circumferentially elongated rim strip, where the rim includes a radially outwardly projecting first bead flange, a radially outwardly projecting second bead flange laterally spaced from the first bead flange, and a radially outwardly facing tire bed surface positioned laterally between the first bead flange and the second bead flange, and where the inboard surface of the rim strip circumscribes the tire bed surface; where the rim strip includes an overall lateral width between the first lateral edge and the second lateral edge and a radial thickness between the outboard surface and the inboard surface; and where the radial thickness is variable across the lateral width to include a first lateral region having a first radial thickness and a second lateral region having a second radial thickness, where the first radial thickness is thicker than the second radial thickness.

In addition, the invention relates to a rim sealing strip comprising: a circumferentially elongated rim strip having a radially outwardly facing outboard surface, a radially inwardly facing inboard surface, a first lateral edge and a second lateral edge laterally spaced from the first lateral edge; where the rim strip includes an overall lateral width between the first lateral edge and the second lateral edge and a radial thickness between the outboard surface and the inboard surface; and where the rim strip includes a first lateral region and a second lateral region laterally adjoining the first lateral region; and where the material stiffness of the first lateral region has greater stiffness than the material stiffness of the second lateral region.

The invention also relates to a rim comprising: a rim, the rim comprising: a radially outwardly facing tire bed surface along a circumference of the rim; and channel laterally positioned generally in the center of the tire bed surface and along the entire circumference; where the tire bed surface includes an unsealed opening there through to communicate to the atmosphere; and where the channel has a lateral width that completely laterally overlaps the opening.

Additionally, the invention relates to a rim system comprising: a rim, the rim comprising: a tire bed surface along a circumference of the rim; a channel generally in the center of the inner surface and generally along the entire circumference; a rim strip configured to be removeably seated in the channel; and rim tape configured to adhere to the tire bed surface and the rim strip.

The invention also relates to an air barrier for a tubeless rim, the air barrier comprising: a rim strip configured to be removeably seated in a center channel located on a tire bed surface along a circumference of a tubeless rim; and rim tape configured to adhere to the inner surface and the rim strip.

In addition, the invention relates to a rim sealing strip comprising: a circumferentially elongated rim strip having a radially outwardly facing outboard surface, a radially inwardly facing inboard surface, a first lateral edge and a second lateral edge laterally spaced from the first lateral edge; where the rim strip includes an overall lateral width between the first lateral edge and the second lateral edge and a radial thickness between the outboard surface and the inboard surface; and where the rim strip includes a first lateral region and a second lateral region laterally adjoining the first lateral region; and where at least one of: (i) the radial thickness is variable across the lateral width to include a first lateral region having a first radial thickness and a second lateral region having a second radial thickness, where the first radial thickness is thicker than the second radial thickness; and (ii) the material stiffness of the first lateral region is greater than the material stiffness of the second lateral region.

BRIEF DESCRIPTION OF THE DRAWINGS

The present disclosure will be better understood by those skilled in the pertinent art by referencing the accompanying drawings, where like elements are numbered alike in the several figures, in which:

FIG. 19 is a cross-sectional view of one embodiment of a rim;

FIG. 20 is a close up view of a bead flange from FIG. 19;

FIG. 21 is a cross-sectional view of another embodiment of a rim; and

FIG. 22 is a close up view of a bead flange from FIG. 21.

DETAILED DESCRIPTION OF THE INVENTION

Figure 1:
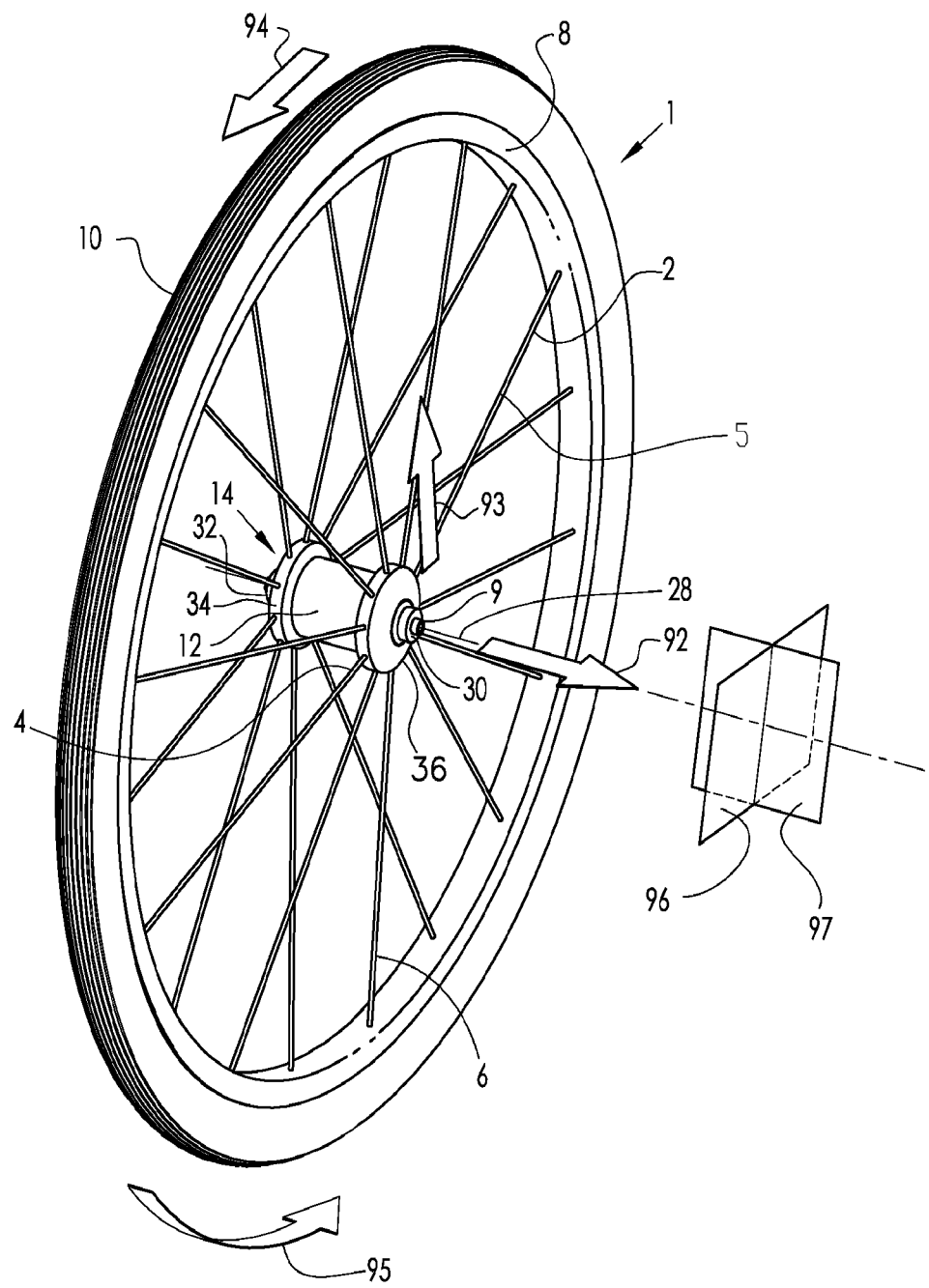
FIG. 1 is a perspective view of a prior art rim and tire.

FIG. 1 describes the basic configuration of an exemplary prior art vehicle wheel, in particular, a bicycle wheel 1, as well as a description of the direction conventions used throughout this disclosure. The hub assembly 14 includes a rotatable hub shell 12 and a stationary axle 9, with bearings (not shown) to facilitate rotation of the hub shell 12 about the axial axis 28. The hub shell 12 includes at least two axially spaced hub flanges 34 and 36, each of which include a means for connecting with the spokes. The axle 9 includes end faces 30 and 32 to interface with the dropouts (not shown). The axial axis 28 is the axial centerline of rotation of the bicycle wheel 1. The hub flanges 34 and 36 may be contiguous with the hub shell 12 or may be separately formed and assembled to the hub body portion of the hub shell 12. The spokes 2 are affixed to the hub flanges 34 or 36 at their first end 4 and extend to attach the rim 8 at their second end 6. The tire 10 is fitted to the outer periphery of the rim 8. The wheel of FIG. 1 is generic and may be of tension-spoke or compression-spoke design.

The axial direction 92 is a direction parallel with the axial axis 28. The radial direction 93 is a direction generally perpendicular to the axial direction 92 and extending generally from the axial axis 28 radially outwardly toward the rim 8. The tangential direction 94 is a direction perpendicular to both the radial direction 93 and axial direction 92, defining a generally tangent vector at a given radius. The circumferential direction 95 is a cylindrical vector that wraps around the axial axis 28 at a given radius. A radial plane 96 is a plane perpendicular to the axial axis 28 that extends in a generally radial direction at a given axial intercept. An axial plane 97 is a plane that is generally parallel to the axial axis.

In the ensuing descriptions, the term "axial" refers to a direction parallel to the centerline of the axial axis and the term "radial" refers to a direction perpendicular to the axial axis 28. The term "lateral" refers to a direction generally parallel to the axial axis 28 when describing the region of the rim 8 and tire 10. An axially inboard (or inward) orientation is an orientation that is axially proximal to the axial midpoint between the two end faces 30 and 32. Conversely, an axially outboard (or outward) orientation is an orientation that is axially distal to the axial midpoint between the two end faces 30 and 32. A radially inboard (or inward) orientation is an orientation that is radially proximal to the axial axis 28 and a radially outboard (or outward) orientation is an orientation that is radially distal to the axial axis 28. A laterally inboard (or inward) orientation is an orientation that is axially proximal to the lateral midpoint between the two bead flanges 180 and 184. Conversely, a laterally outboard (or outward) orientation is an orientation that is axially distal from the lateral midpoint between the two bead flanges 180 and 184. An axially inboard (or inward) facing surface is a surface that faces toward the axial midpoint between the two end faces 30 and 32. Conversely, an axially outboard (or outward) facing surface is a surface that faces away from the axial midpoint between the two end faces 30 and 32.

Figure 2:
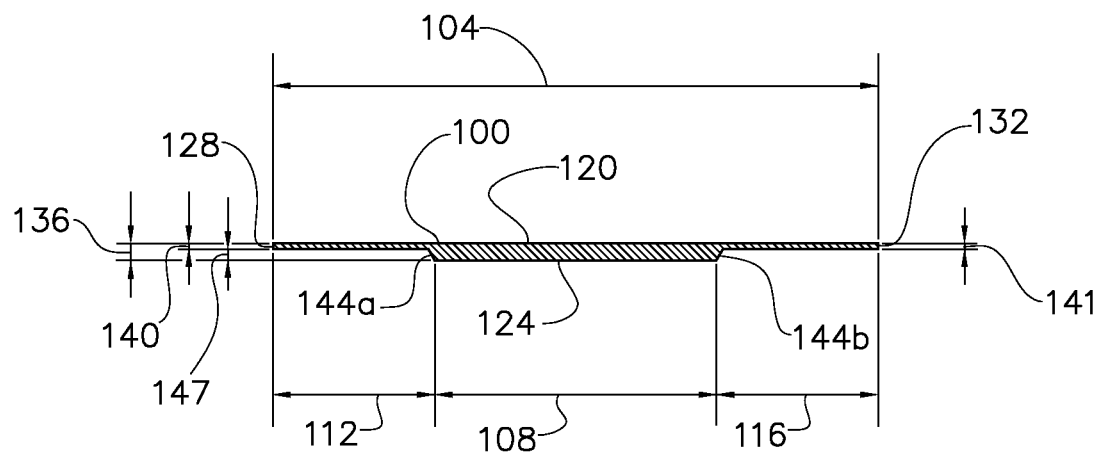
FIG. 2 is a cross-sectional view of one embodiment of the rim tape.

FIG. 2 shows a front cross-sectional view of one embodiment of the rim strip 100. The rim strip 100 has an overall lateral width 104, a first lateral region 108, a second lateral region 112, and a third lateral region 116. The rim strip has an outboard surface 120, and an inboard surface 124. The rim strip 100 has a first lateral edge 128, and a second lateral edge 132. The rim strip 100 has a first radial thickness 136, a second radial thickness 140, and a third radial thickness 141. The rim strip 100 has a radial transition step 144*a* of transition dimension 147 between the first lateral region 108 and second lateral region 112 and a radial transition step 144*b* between the first lateral region 108 and the third lateral region 116.

Figure 3:
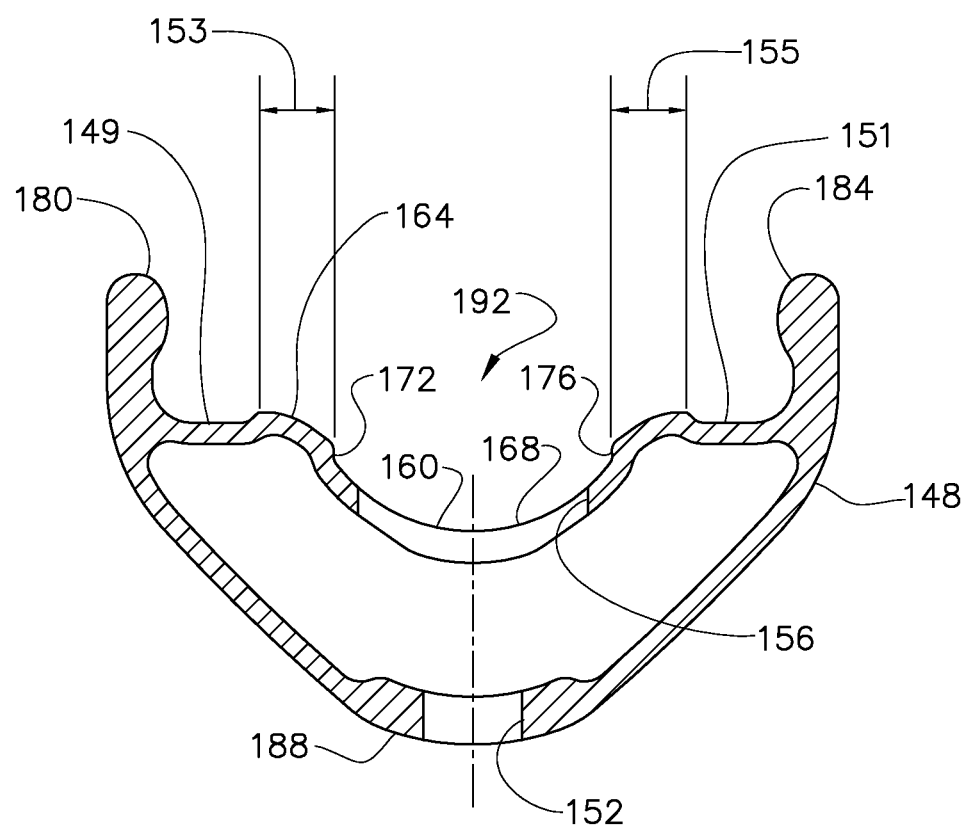
FIG. 3 is a cross-sectional view of one embodiment of a rim.

FIG. 3 is a cross-sectional view at generally one of the spoke holes of one embodiment of a double walled rim 148. The rim 148 includes a spoke bed wall 188 with a spoke hole 152 therethrough, and a tire bed wall 164 with a spoke access hole 156 therethrough. There is a channel 160 located on the radially outwardly facing external tire bed surface 192 of the tire bed wall 164 along generally the entire circumference of the rim. The channel 160 comprises an offset surface 168, that is generally radially inwardly offset from the remainder of the tire bed surface 192 and is laterally flanked by step edges 172 and 176. Step edges laterally straddle and are laterally outboard of spoke access hole 156. The rim 148 comprises a first bead flange 180, a second bead flange 184, a first bead seat 149, and a second bead set 151. The step edge 172 is laterally offset from the first bead set seat 149 by dimension 153 and the step edge 176 is laterally offset from the second bead set 151 by dimension 153. A spoke bed wall 188 is adjacent to the spoke hole 152. The external tire bed surface 192 comprises the tire bed wall 164, step edges 172, 176, channel 160, and generally the radially outboard rim surface from the first bead flange 180 to the second bead flange 184.

Figure 4:
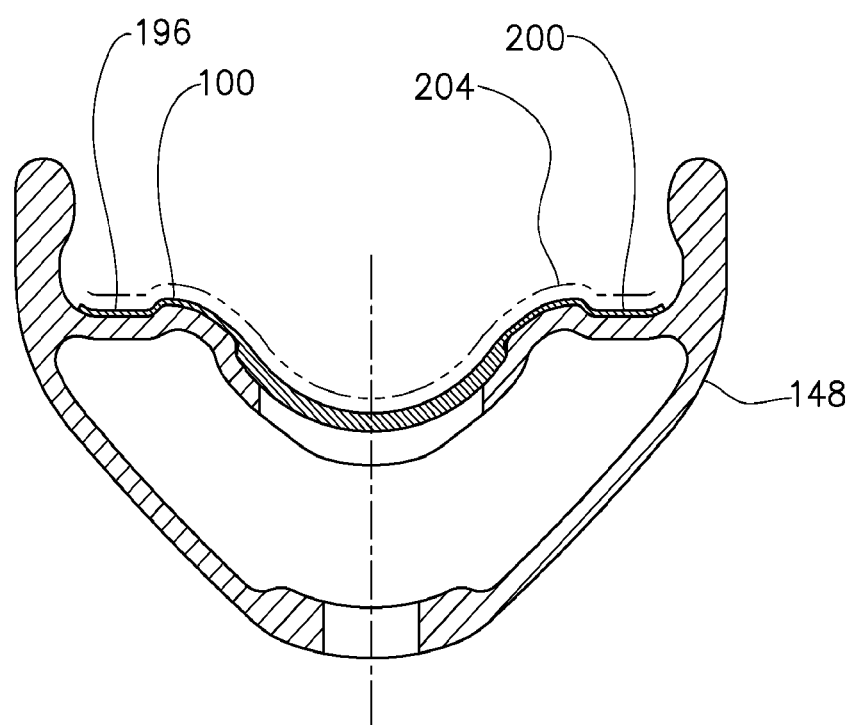
FIG. 4 is a cross-sectional view of a rim of FIG. 3 with rim tape of FIG. 2 installed.

FIG. 4 is the rim 148 from FIG. 3, with the rim strip 100 from FIG. 2 installed on the tire bed surface 192. The second lateral region 112 and third lateral region 116 abut the rim 148 at a first bead sealing surface 196 and second bead sealing surface 200, respectively. The rim strip 100, as it lies on the rim 148, forms generally a tire interface contour 204. The tire interface contour 204 may conform to ETRTO 27.4 and/or to ETRTO 28.2 specifications, see Appendix A. The second radial thickness 140 and third radial thickness 141 may have a similar thickness dimension to conventional rim sealing tape. It is noted that the channel 160, with offset surface 168 provides a radially inwardly relieved profile contour to accommodate the greater radial thickness dimension associated with first radial thickness 136 such that the desired tire interface contour 204 is maintained.

Figure 5:
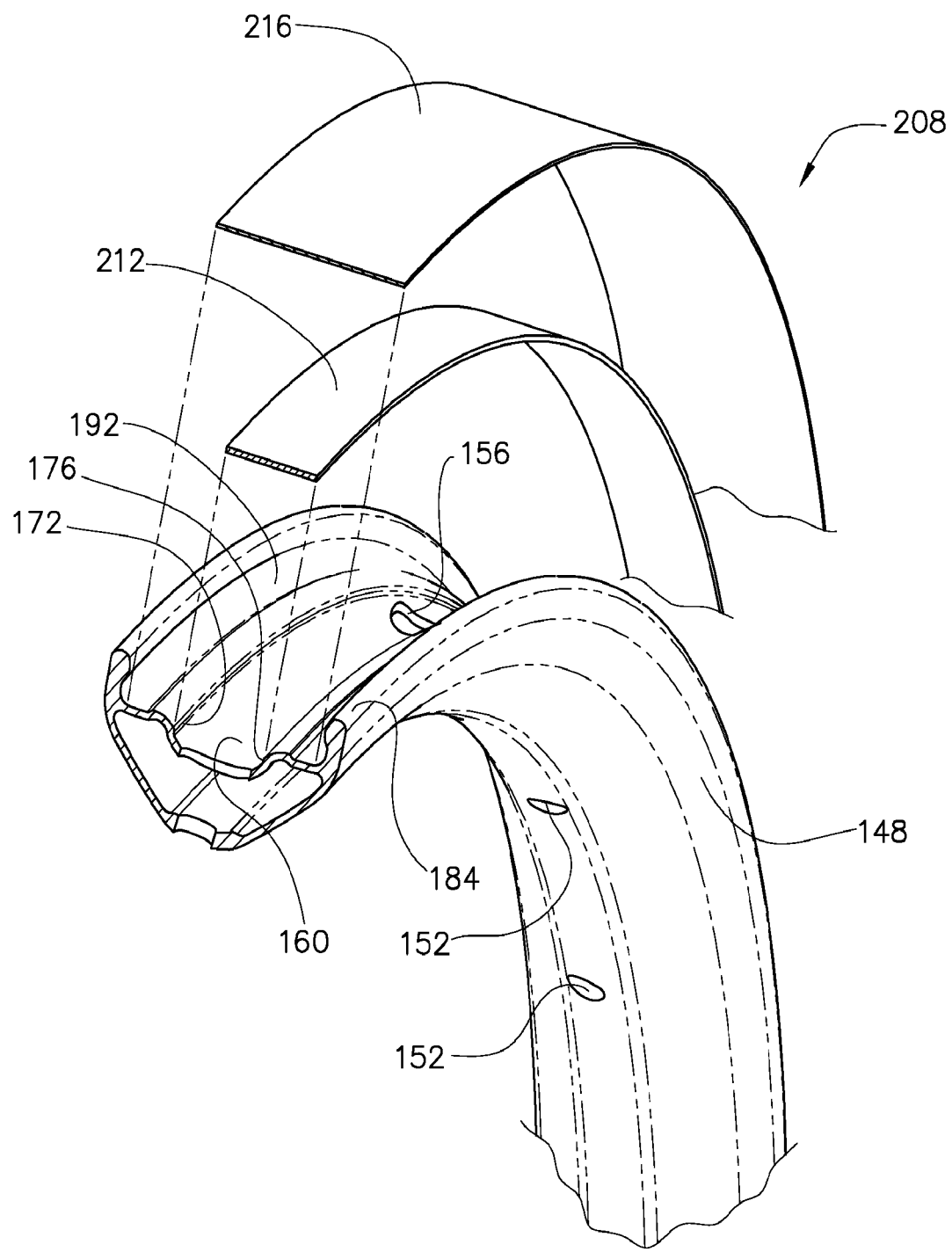
FIG. 5 is a partial perspective cross section view of another embodiment of a rim and rim strip system.

FIG. 5 is a partial perspective assembly view of one embodiment of the double walled rim 148 and rim strip system 208. The rim strip system 208 is shown prior to assembly with the rim 148 and comprises a rim strip 212 and rim tape 216. The rim strip 212 is configured to seat in the channel 160. The rim tape 216 is configured to cover the rim strip 212 and the external tire bed surface 192. In one embodiment the rim strip 212 and rim tape 216 may be made of the same material. In other embodiments, the rim strip may be made out of a stronger and/or stiffer material than the rim tape 216.

Figure 6:
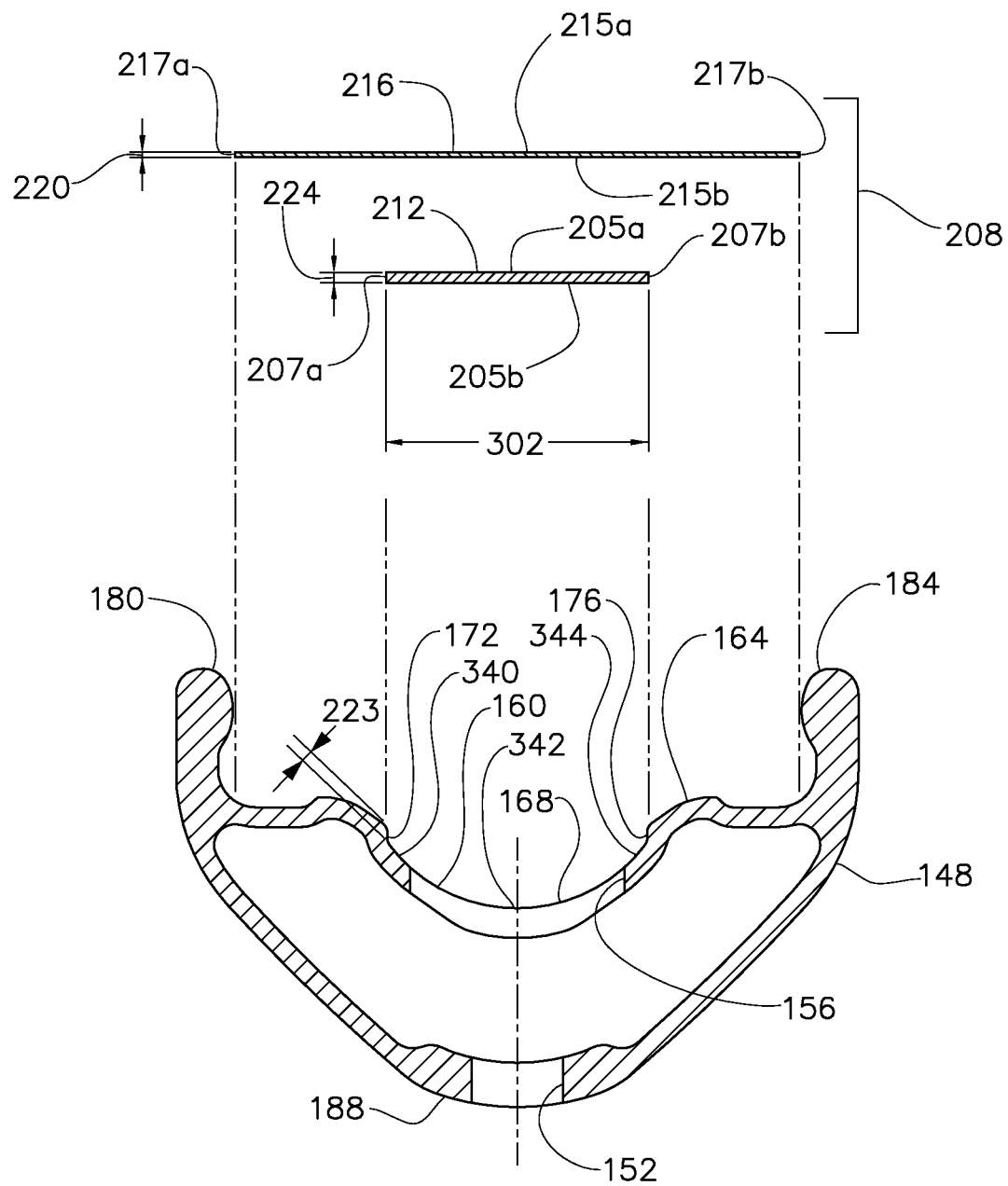
FIG. 6 is an exploded cross-sectional view of the embodiment of FIG. 5.

FIG. 6 is a cross-sectional view at generally one of the spoke holes of one embodiment of a double walled rim 148 with the rim strip system 208 shown prior to being installed on the rim 148. The rim tape 216 laterally spans between a first edge 217a and a second edge 217b and may have a thickness 224 between a radially outboard surface 215a and a radially inboard surface 215b. The rim strip 212 laterally spans between a first edge 207a and a second edge 207b and may have a thickness 220 between a radially outboard surface 205a and a radially inboard surface 205b. In the embodiment shown, the rim strip thickness 220 is greater than the rim tape thickness 224. In other embodiments, the rim strip thickness 220 may be less than, or equal to, the rim tape thickness 224. Note how the rim strip 212 has a lateral width 302 that is sized to generally fit in the channel 160, with first edge 207a laterally aligned with step edge 172 and second edge 207b laterally aligned with step edge 176. The rim tape 216 is sized to generally fit in the external tire bed surface 192. The rim strip 212 is configured to cover the spoke access holes 156.

Figure 7:
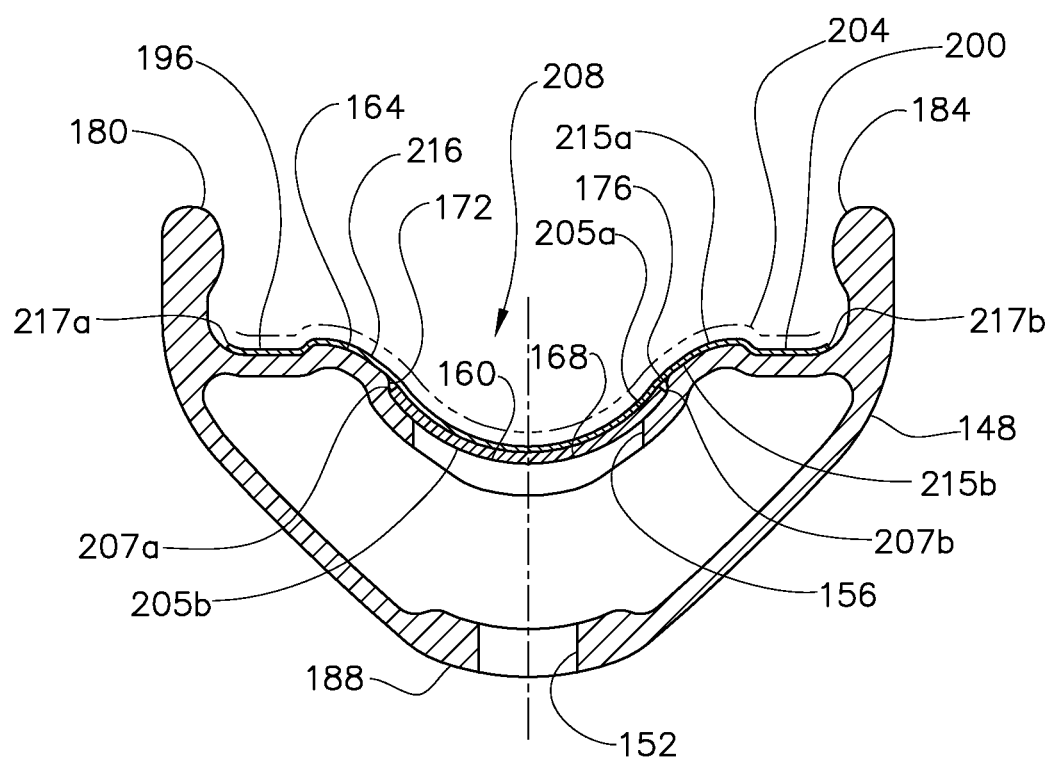
FIG. 7 is a cross-sectional view of the rim strip system of FIG. 6 installed on the rim.

FIG. 7 is the double walled rim 148 with the rim strip system 208 installed on the rim 148. The circumferential rim strip 212 is first circumferentially wrapped and installed to nest within the circumferential channel 160, with first edge 207a laterally adjacent to step edge 172 and second edge 207b laterally adjacent to step edge 176. It is important for the rim strip 212 to be laterally aligned with the channel 160 to insure that the spoke access holes 146 remain covered by the rim strip 212 during installation and use. Step edges 172 and 176 may serve as a visual aid for proper alignment of the rim strip 212 during installation. Step edges 172 and 176 may also serve as bounds to laterally confine the rim strip 212 and restrain the rim strip 212 from slipping and/or migrating laterally outwardly of channel 160. Step edges 172 and 176 may also serve to define the edges of the channel 160, thereby utilizing the channel 160 as a circumferential socket such that the rim strip 212 will become self-aligned and nested within the channel 160. The thickness 224 may have a similar thickness dimension to conventional rim sealing tape. It is noted that the channel 160, with offset surface 168 provides a radially inwardly relieved profile contour having offset dimension 223 (FIG. 6) that preferably corresponds to the thickness 224 of the rim strip 212 such that the desired tire interface contour 204 is maintained.

It may be preferable that the rim strip 212 be made of a reasonably stiff a strong material to bridge across the spoke access holes 156 (or other opening in the tire bed wall 164) without excessive herniation or distortion. It may also be preferable that the rim strip 212 be made of a reasonably cut-resistant, pierce-resistant, and abrasion-resistant material so that any sharp edges associated with the spoke access holes 156 and/or with the spokes 2 will not rupture the rim strip system 208, even with high tire inflation pressure and/or with prolonged use. One candidate material for the rim strip 212 is nylon.

The circumferential rim tape 216 is next circumferentially wrapped and installed to laterally cover the rim strip 212 and the remainder of the tire bed surface 192 as shown in FIG. 7. It may be preferable that the rim tape 216 be made of a highly conformable material so that it may conform to the complex contours of the tire bed surface 192. When the rim strip system 208 is installed on the rim 148, a tire interface contour 204 is formed. By faithfully and accurately conforming to the tire bed surface 192, the resulting tire interface contour 204 of the rim tape 216 may be highly accurate and predictable so that the tire (not shown) may have a reliable interface with the rim strip system 208 to insure easy installation and proper pneumatic sealing of the tire when mounted to the rim 148. One candidate material for the rim tape 216 is TPP (tensilized polypropylene).

The rim strip 212 and/or rim tape 216 may be formed as a linear strip that is wrapped circumferentially around the tire bed surface 176, such that its two ends are circumferentially overlapping. Alternatively, the rim strip 212 and/or rim tape 216 may be formed as a closed circumferential hoop that is wrapped circumferentially around the tire bed surface 192.

The rim strip 212 may also include adhesive at the interface with the inboard surface 205b and the channel 160 to secure the rim strip 212 to the tire bed surface 192 and to resist any misalignment therebetween. Similarly, the rim tape 216 may also include adhesive at the interface with the inboard surface 215b and the outboard surface 205a and/or the remainder of the tire bed surface 192 to secure the rim tape 216 thereto and to resist any misalignment therebetween.

The rim strip 212 may first be installed on the rim 148 as described, with the rim tape subsequently installed on the rim 148 and over the rim strip 212 as described in a two step procedure. Alternatively, prior to installation with the rim 148, the rim strip 212 may be pre-laminated to the rim tape 216 at the interface where they overlap. This pre-lamination may then be installed and assembled to the rim as described in the embodiment of FIGS. 9 and 10.

Figure 8:
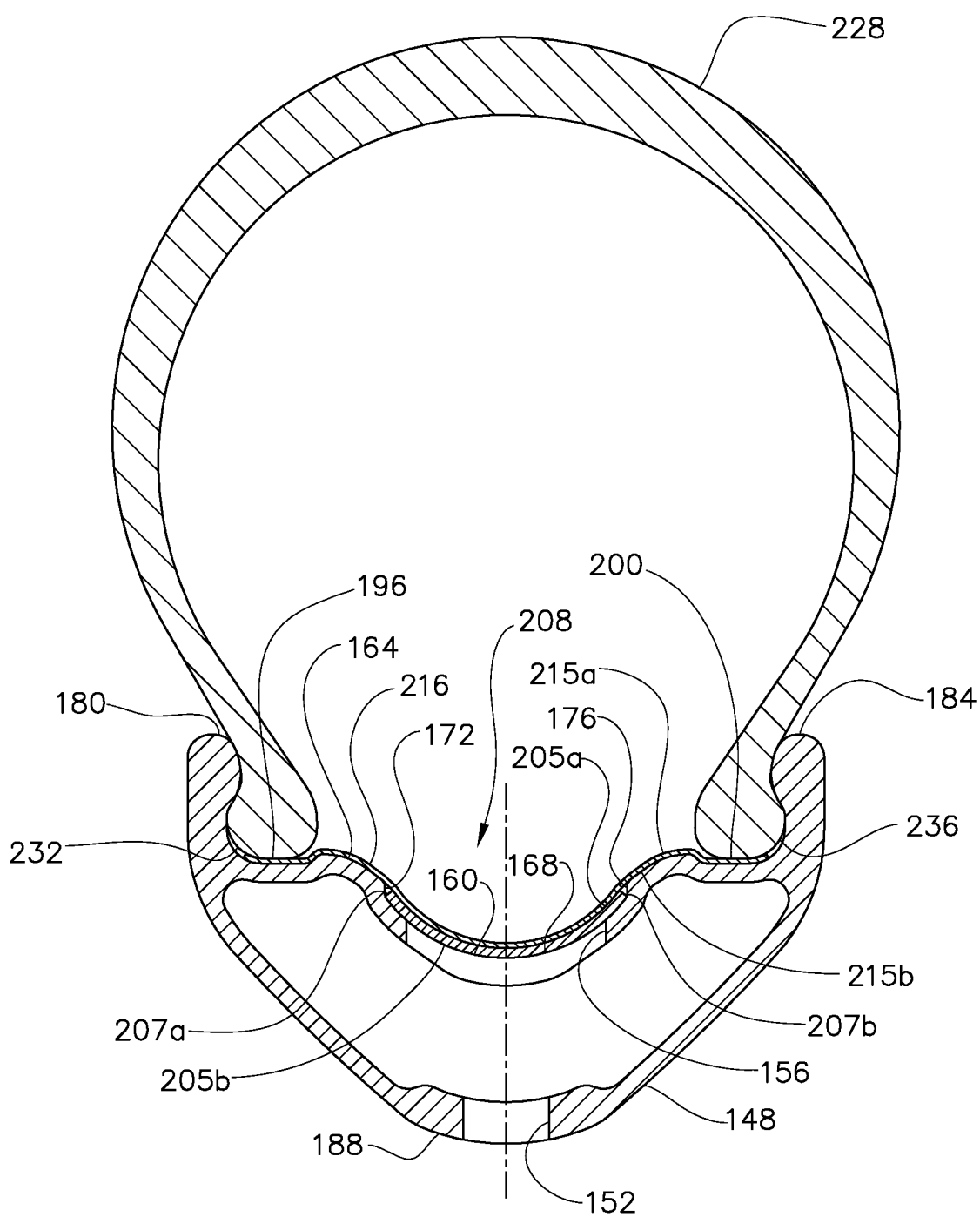
FIG. 8 is a cross-sectional view of the rim strip system of FIG. 7, with a tire installed on the rim.

FIG. 8 is the system from FIG. 7, with a tubeless tire 228 installed on rim 148. The tire 228 consists of a first bead 232 and a second bead 236. When the tire 228 is properly installed on the rim 148, the first bead 232 makes an airtight seal along the first bead sealing surface 196, and the second bead 236 makes an airtight seal along the second bead sealing surface 200. As shown here, the rim tape 216 may span laterally between the first bead sealing surface 196 and the second bead sealing surface 200 to insure a continuous uninterrupted sealing surface therebetween and to provide a reliable airtight seal between the first bead 232 and second bead 236.

Figure 9:
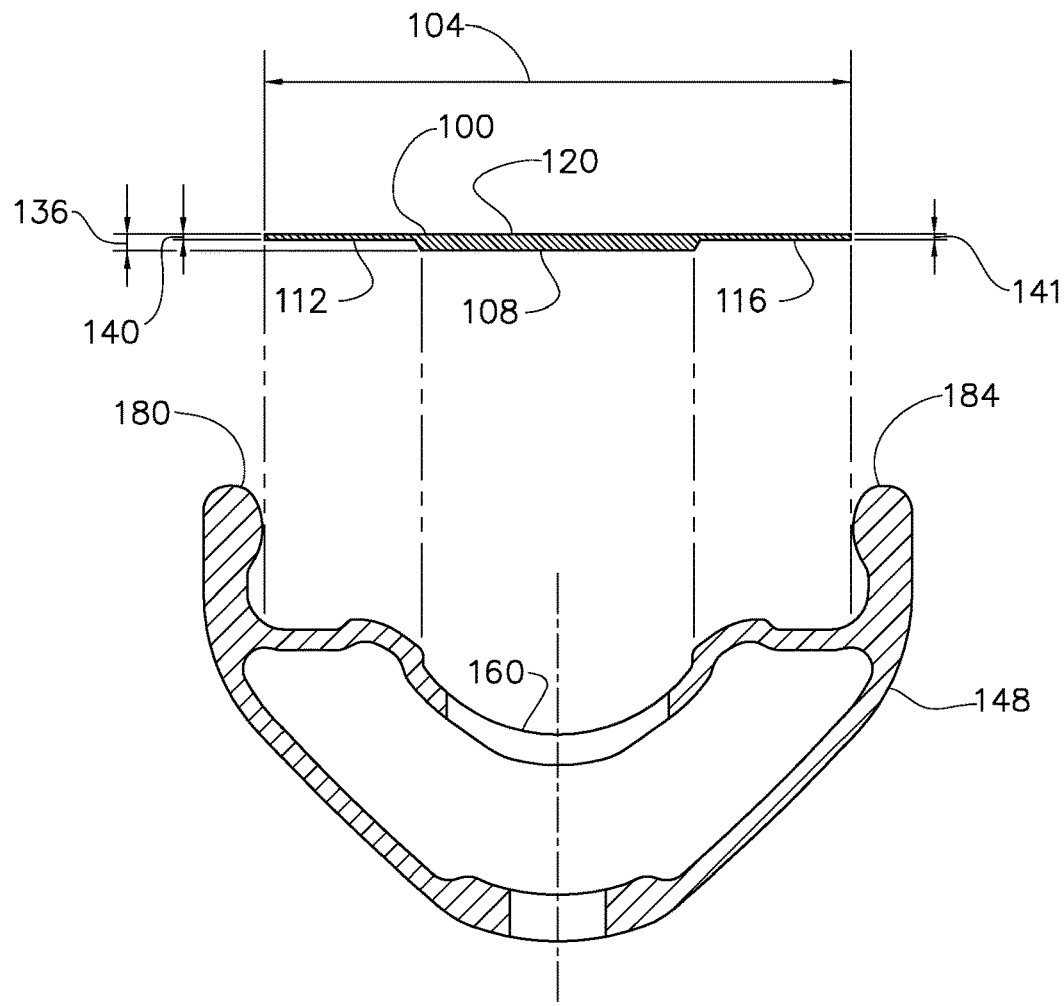
FIG. 9 is a cross-sectional view of another embodiment of the rim tape and rim.

FIG. 9 is a double walled rim 148 with the rim strip 100 from FIG. 2. FIG. 9 shows one orientation of the rim strip 100 with respect to the rim 148. However, in other embodiments, the rim strip 100 may be turned over with respect to the rim 148 such that the radial transition steps 144a and/or 144b face in a radially outwardly direction.

Figure 10:
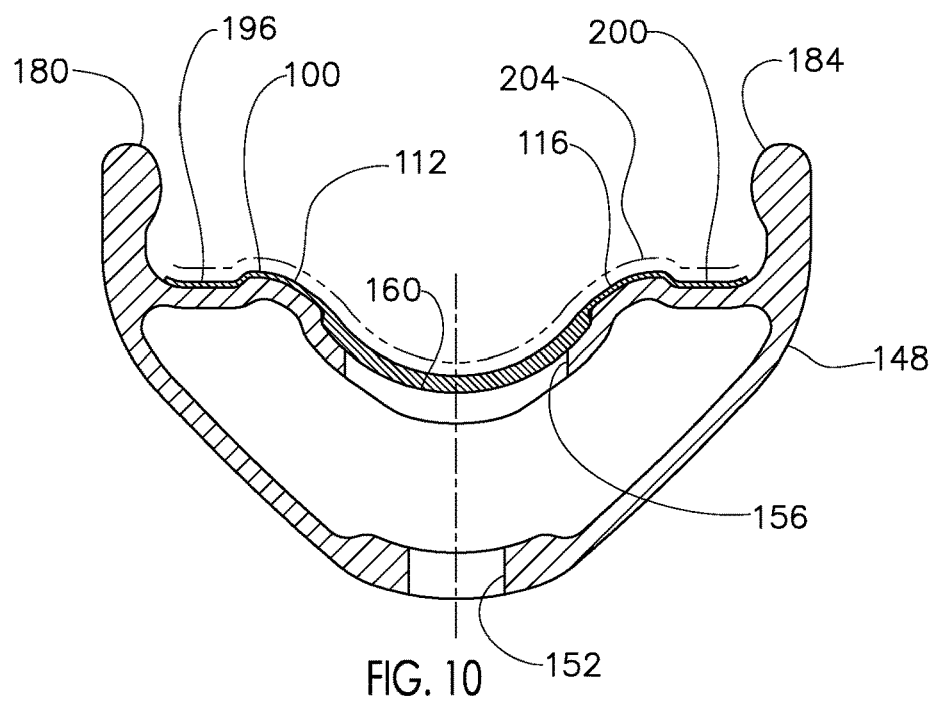
FIG. 10 is a cross-sectional view of the embodiment of FIG. 9, showing the rim tape from FIG. 9 installed on the rim.

FIG. 10 shows the rim strip 100 installed on the rim 148. The first lateral region 108 with the first radial thickness 136 generally seats and nests into the channel 160. The second lateral region 112 forms the first bead sealing surface 196 by conforming to the tire bed surface 192, similarly the third lateral region 116 forms the second bead sealing surface 200 by conforming to the tire bed surface 192. Since the first lateral region 108 is generally seated in the channel 160, the outboard surface 120 of the rim strip 100 forms a tire interface contour 204. The radial transition step 144*a* is laterally adjacent to step edge 172 and the radial transition step 144*b* is laterally adjacent to step edge 176. As described hereinabove, it is important for the rim strip 100 to be laterally aligned with the channel 160. Also as described hereinabove, step edges 172 and 176 may serve as a visual aid for proper alignment of the rim strip 100 during installation and may also serve as bounds to laterally abut respective transition steps 144*a* and 144*b* and laterally restrain the rim strip 212 and may also serve to define the edges of the channel 160, creating a circumferential socket such that the rim strip 212 will become self-aligned and nested within the channel 160.

Due to its greater first radial thickness 136, the first lateral region 108 tends to have greater strength, stiffness, cut-resistance, and pierce-resistance properties in comparison to the lesser second radial thickness 140 and lesser third radial thickness 141. These greater properties of the first lateral region 108 serve to provide the advantages described hereinabove for protective covering of the spoke access holes 156. Further, lesser second radial thickness 140 and lesser third radial thickness 141 may correspond to the greater conformability of the second lateral region 112 and third lateral region 116 in comparison with the thicker first lateral region 108. The advantages of this greater conformability are described hereinabove.

The rim strip 100 may be formed as a linear strip that is wrapped circumferentially around the tire bed surface 176. Alternatively, the rim strip 100 may be formed as a closed circumferential hoop that is wrapped circumferentially around the tire bed surface 176. Also, the rim strip 100 may include adhesive at the interface with the inboard surface 124 and the tire bed surface 192 to resist any misalignment therebetween.

As shown here, the rim strip 100 may span laterally between the first bead sealing surface 196 and the second bead sealing surface 200 to insure a continuous uninterrupted sealing surface therebetween and to provide a reliable airtight seal between the first bead 232 (not shown) and second bead 236 (not shown) of a tire 228 (not shown) mounted thereto.

Figure 11:
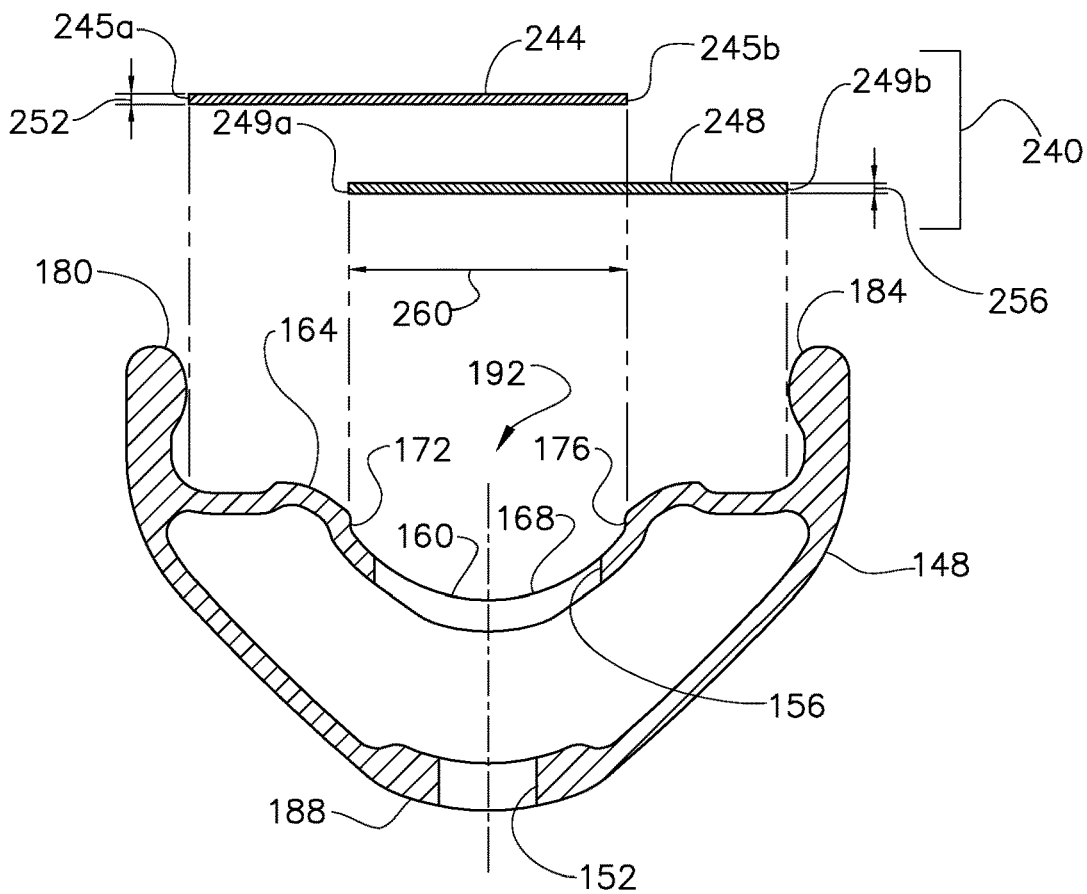
FIG. 11 is a cross-sectional view of another embodiment of a rim tape system and rim.

FIG. 11 is a cross-sectional view at generally one of the spoke holes of one embodiment of a double walled rim 148 with another embodiment of a rim strip system 240. Rim strip system 240 comprises a first length of rim tape 244 and a second length of rim tape 248. First length of rim tape 244 has a thickness 252 and lateral edges 245*a* and 245*b*, and second length of rim tape 248 has a thickness 256 and lateral edges 249*a* and 249*b*. Thickness 252 and thickness 256 may generally be equal. The two rim tapes 244, 248 will be installed on the rim 148 such that the tapes 244, 248 will generally overlap at the channel 160.

Figure 12:
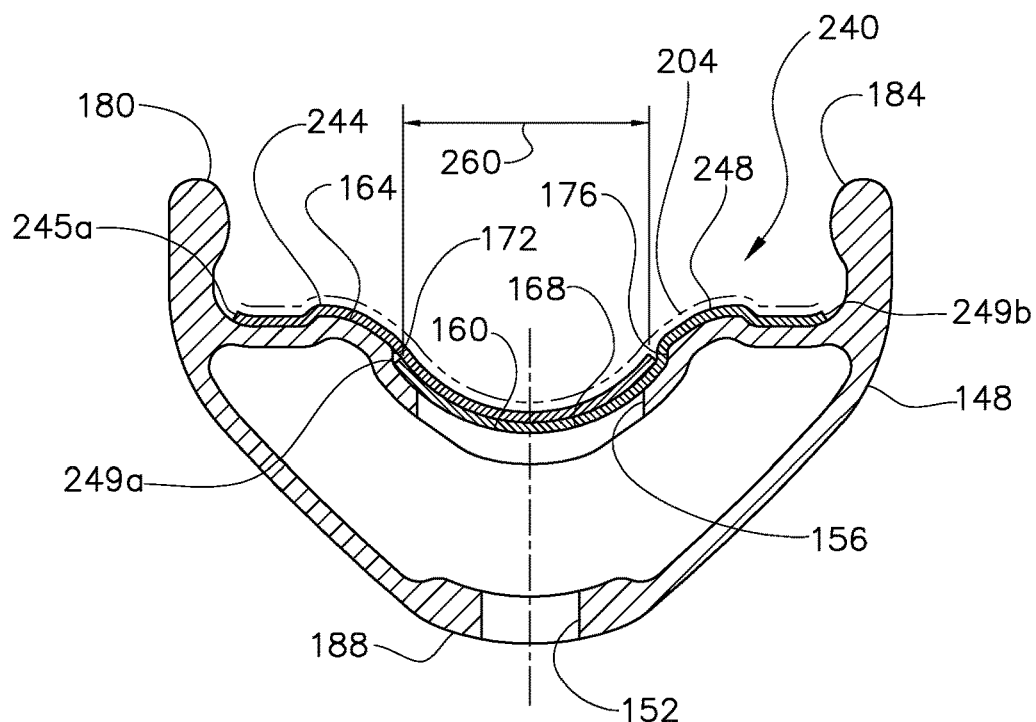
FIG. 12 is a cross-sectional view of the embodiment of FIG. 11, showing the rim tape system from FIG. 11 installed on a rim.

FIG. 12 shows the rim strip system 240 installed on the rim 148. The overlapped tape region 260 generally fill the channel 160, with lateral edge 249*a* laterally aligned with and adjacent step edge 172. Rim tape 248 is conformed to tire bed surface 192 such that the imprint of the step edge 176 is visible on its radially outward facing surface as shown such that step edge 176 is next laterally aligned and adjacent to lateral edge 245*b*. The overlapping thicknesses 252 and 256 combine to create a thicker overlap region 260 that laterally corresponds to channel 160 as shown. This thicker region tends to have greater strength, stiffness, cut-resistance, and pierce-resistance properties in comparison to the non-overlapping portions of the rim tapes 244 and 248. Also, the non-overlapping portions of the rim tapes 244 and 248 are thinner than the overlap region 260 and may tend to have greater conformability. These greater properties of the overlap region 260 serve to provide the advantages described hereinabove for protective covering of the spoke access holes 156. Further, the greater conformability of the non-overlapping portions of the rim tapes 244 and 248 may provide advantages as also described hereinabove. The thicknesses 252 and 256 may be of a similar thickness dimension to conventional rim sealing tape. It is noted that the channel 160, with offset surface 168 provides a radially inwardly relieved profile contour to accommodate the greater thickness associated with the stacked and combined thicknesses 252 and 256 in the overlap region 268 such that the desired tire interface contour 204 is maintained. Rim tapes 244 and/or 248 may also include adhesive at the overlapping interface associated with overlap region 260 and/or at the interface between the rim tapes 244 and 248 and the tire bed surface 192. Rim tapes 244 and 248 may be pre-laminated prior to their installation with the rim 148.

Figure 13:
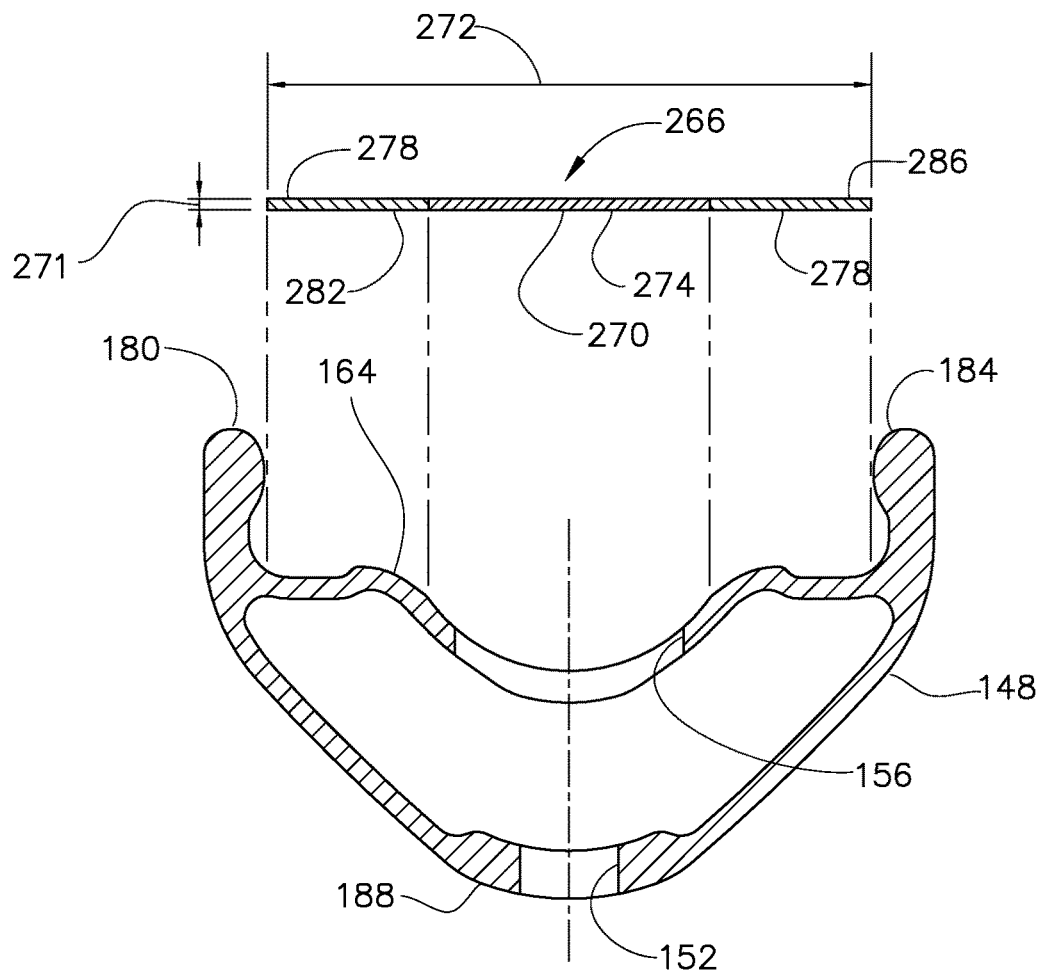
FIG. 13 is a cross-sectional view of another embodiment of a rim tape system and rim.

FIG. 13 is a cross-sectional view at generally one of the spoke holes of one embodiment of a double walled rim 148 with another embodiment of rim tape 266. Rim tape 266 comprises at least two materials formed into the rim tape 266. A first material 270 is harder and stiffer and occupies a middle lateral region 274 of the rim tape 266. A second material 278 is softer and more flexible and occupies a first lateral region 282 of the tape 266 and a second lateral region 286 of the tape 266. The first lateral region 282 and a second lateral region 286 are shown to laterally straddle the middle lateral region 274. The middle lateral region 274, first lateral region 282, and second lateral region 286 are integrally joined as one rim tape 266 having an overall lateral width 272. The rim tape 266 may have a generally constant thickness 271. The middle section 274 is sized to laterally overlap and cover the spoke access holes 156. Please note, in this embodiment, the rim 148 may not have the step edges 172, 176, nor the offset surface 168, since the rim tape 266 is shown here to have a constant thickness 271.

Figure 14:
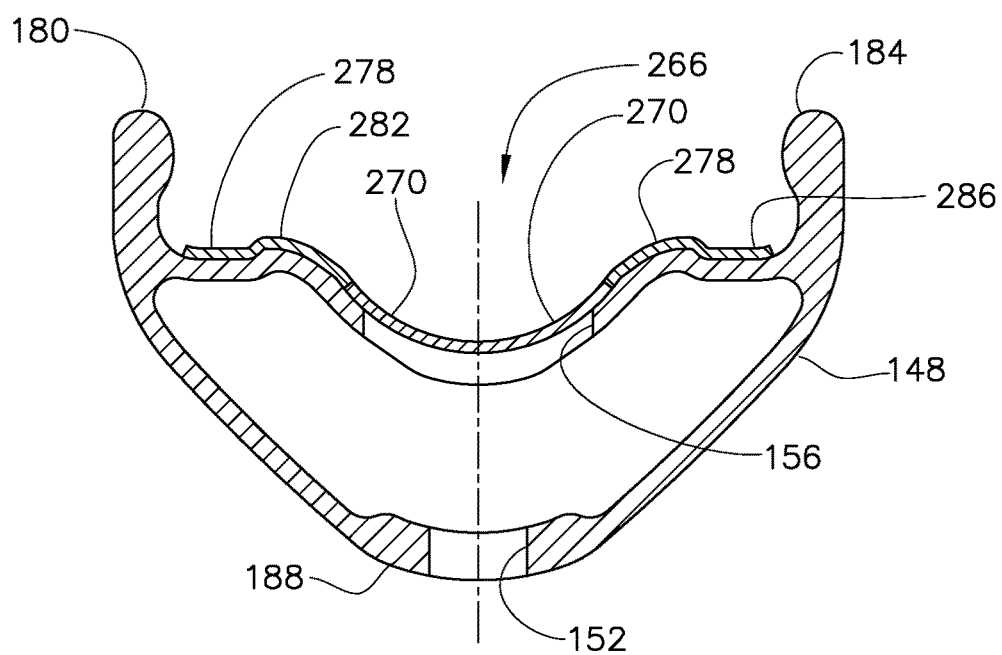
FIG. 14 is a cross-sectional view of the embodiment of FIG. 13, showing the rim tape system from FIG. 13 installed on a rim.

FIG. 14 shows the rim tape 266 installed on the rim 148. The middle section 274 generally covers the spoke access holes 156. It may be preferable that the middle lateral region 274 be made of a reasonably stiff, strong, cut-resistant, to provide the corresponding benefits associated with these properties as described hereinabove. It may also be preferable that the first lateral region 282 and second lateral region 286 be made of a highly conformable material so that it may conform to the complex contours of the tire bed surface 192, thereby providing the corresponding benefits described hereinabove. One process to produce the multi-material rim tape 266 described herein is a coextrusion process.

Figure 15:
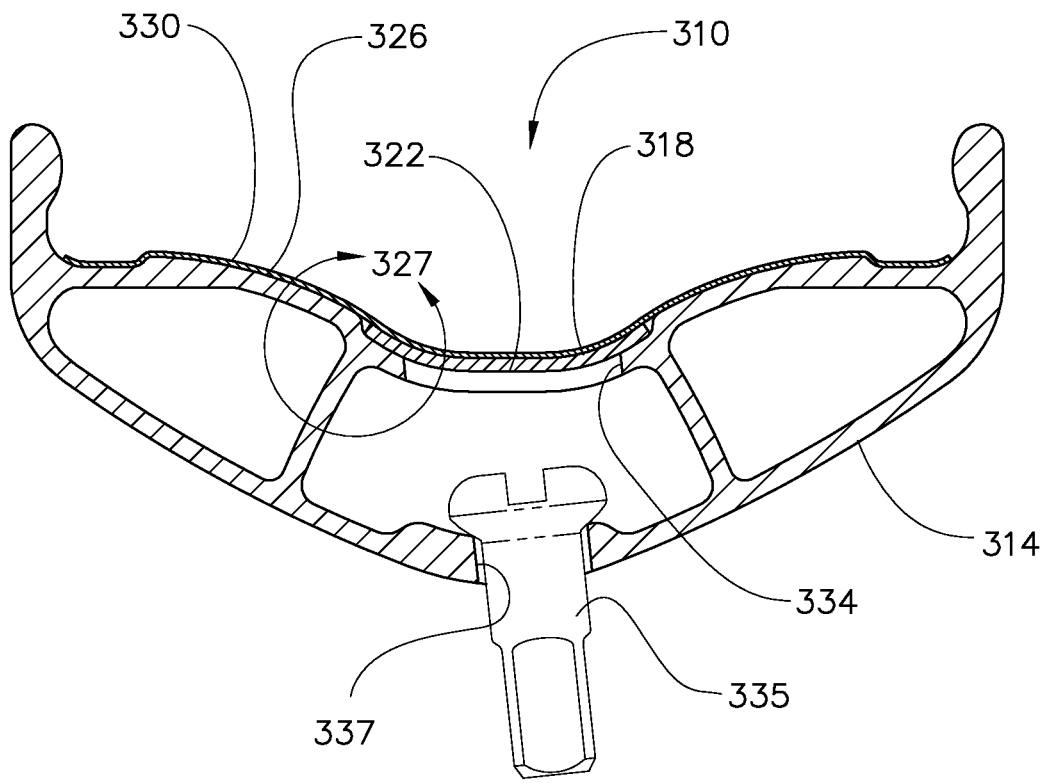
FIG. 15 is a cross-sectional view of the disclosed rim and rim strip and rim tape.

FIG. 15 is a cross-sectional view of another embodiment of the disclosed system 310. The system comprises a rim 314 and a rim strip 318 and rim tape 330. The rim 314 comprises a channel 322 on the inner surface 326 of the rim 314. The rim strip 318 is configured to sit in the channel 322. In one embodiment, with the rip strip 318 seated in the channel 322, the inner diameter of the inner surface 326 is not generally increased due to the depression of the channel 322. In one embodiment, as shown, rim tape 330 is adhered to the inner surface 326. The rim 314 has a plurality of spoke access holes 334. A conventional spoke nipple 335 is shown to be positioned in the spoke hole 337 in the conventional manner for connection with a spoke (not shown).

Figure 16:
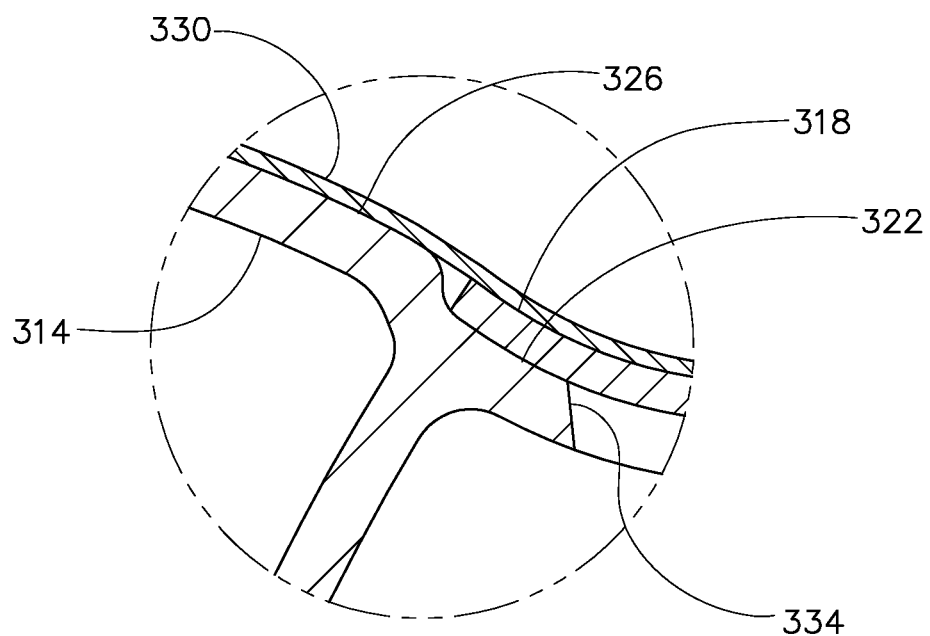
FIG. 16 is a detail cross section view, corresponding to detail 327 of the embodiment of FIG. 15, detailing the interface between the rim strip, the rim tape, and the rim channel.

FIG. 16 is an enlarged detail view of the channel 322 and rim strip 318 shown in FIG. 15. In this view rim tape 330 can be seen. In this view, one can see that the rim tape 330 lies and is adhered to the rim strip 318 and the inner surface 326 of the rim 314.

Figure 17:
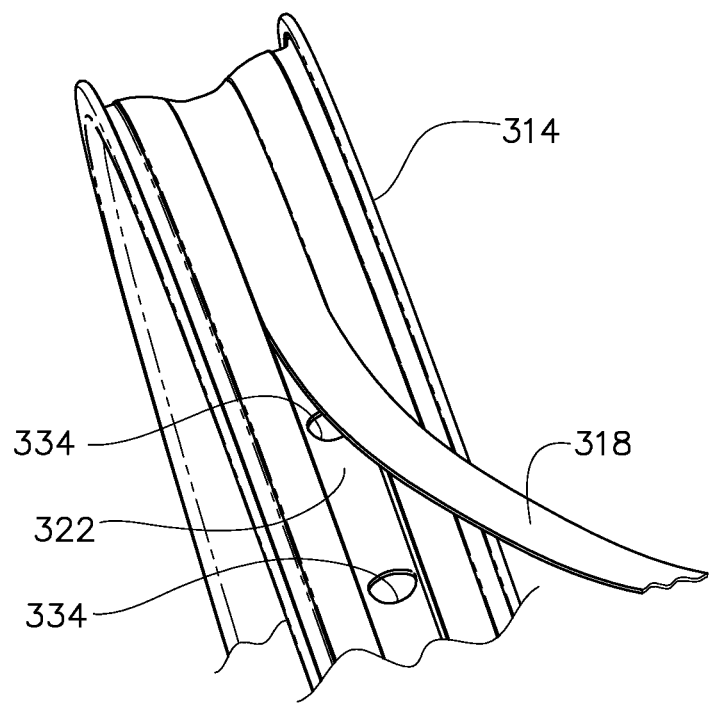
FIG. 17 is a top partial perspective view of the embodiment of FIG. 15, without the rim tape and with the rim strip temporarily dislodged to expose the channel.

FIG. 17 is a top perspective view of one embodiment of the rim 314. In this view, the channel 322 can be seen, and the rim strip 318 can be seen being installed into the channel 322. There is no rim tape 330 in place yet in this view. The channel 322 is positioned along generally the entire circumference of the rim. The rim strip 318 also is configured to be seated in generally the entire circumference of the channel 322. A portion of the rim strip 318 is shown to be temporarily displaced to expose the channel underneath. The rim strip 318 and rim tape 330 act as an air barrier, preventing air from leaving the interior of the tire when the tire is installed on the rim 314. Oftentimes the prevention of air leaving the interior of the tire is enhanced with the use of liquid sealant.

Figure 18:
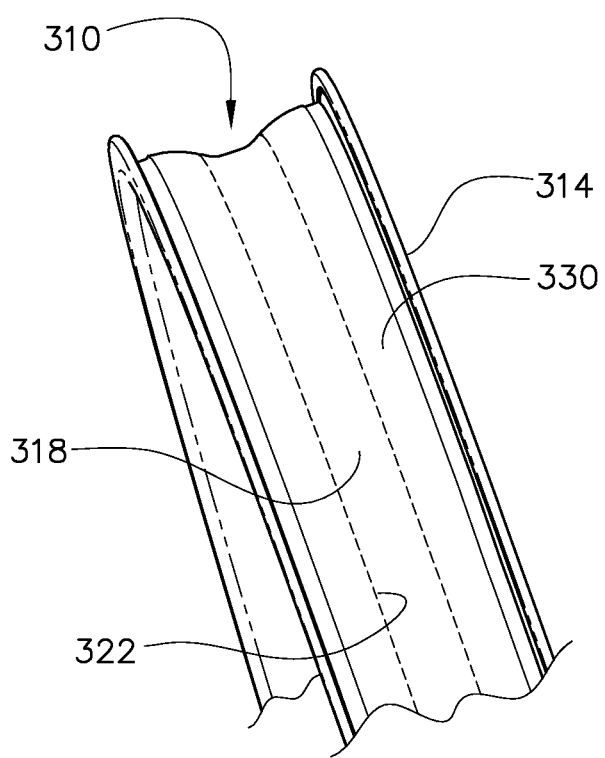
FIG. 18 is a top perspective view of the rim from the FIG. 15, with the rim strip seated into the channel and the rim tape installed to cover the rim strip and the tire bed surface.

FIG. 18 is a top perspective view of the rim 314 from FIG. 17, with the rim strip 318 completely seated in the channel 322, and rim tape 330 completely covering the inner surface 326 of the rim 314.

The disclosed system utilizes a simple conforming rim strip 318 that is sized to fit into a channel 322 designed into the inner rim well of a tubeless rim 314 that does not increase the finished diameter of the inner rim well. In other words, the inner rim well has a relieved surface in the form of channel 322 such that, with the rim strip 318 installed in the channel 322, the resulting tire bed surface has a desired and predetermined profile to next receive the rim tape 330 and to achieve the desired tire interface contour. The thin and flexible rim tape 330 is installed on top of the rim strip 318 to provide an airtight seal. The rim strip 318 may be made from a material (such as, but not limited to nylon) that is tough enough to resist air pressure without excessive deformation or damage and also to resist the piercing force of a spoke breaking at high tension and ejecting radially outwardly. The rim strip 318 may be just wide enough to cover all of the spoke holes 334 with a slight lateral overlap, and it may be the proper hoop diameter to stretch slightly to fit perfectly into the recessed channel 322 in the inner rim surface 326. The rim tape 330 may cover the strip 318 and the entire inner surface 326. It may be flexible enough to conform easily to the contour of the rim 314 and it may have a tough enough adhesive to adhere securely to both the rim 314 and the rim-strip 318. The rim 314 may be designed to fit the rim strip 318 perfectly, including a slight recess 322 that will laterally constrain and lock the rim strip 318 into the correct position.

The disclosed rim 314 with recessed channel 322 and rim strip 318 features a recessed channel 322 to help eliminate instantaneous deflation that comes from broken spokes ejecting through the rim tape 330. By utilizing a custom fit nylon rim strip 318, one can eliminate the occurrence of these types of tape failures. In one embodiment, the rim strip 18 may have a lateral width of around 13 mm. An added benefit is that one can then use a more flexible tape with the disclosed system that does not require the high tensile strength that current tapes require to span the spoke access holes 334 and still remain airtight. As rims are designed to have greater lateral width between bead flanges, this advantage is even more important, since it allows for a more flexible and conformable rim tape 330 that makes rim tape 330 installation much easier.

In some embodiments, the rim strip and/or rim tape may comprise a single monolithic and unitary material with the generally the same material characteristics throughout the rim strip and/or rim tape. In other embodiments, the rim strip and/or rim tape may comprise two or more materials, with each material having different material characteristics, such as but not limited to hardness, stiffness, tear resistance, abrasion resistance, cut resistance, flexibility, conformability, and stretchability.

The disclosed invention includes geometric configurations of rim geometry, including tire bed, bead flanges, well, bead sealing surfaces, etc., and their various radial/lateral/circumferential orientations relative to each other.

The invention to provides a rim sealing tape system that overcomes the shortcomings of the conventional prior art rim tape and provides a sealing means that has the requisite strength and stiffness to effectively bridge openings in the rim, while also having the ductility, flexibility, and conformability to conform to the exterior of the tire bed wall and to create an accurate and predictable tire interface contour with a highly reliable bead sealing interface.

The spoke access holes are commonly positioned within a relatively narrow lateral envelope toward the lateral middle of the tire bed wall. The two bead sealing surfaces are positioned laterally outwardly to straddle these spoke access holes.

FIG. 19 is a cross-sectional view of one embodiment of a double walled rim 148.

FIG. 20 is a close-up view of the second bead flange 184 from FIG. 19. Bead flanges 180 and 184 are superior over known bead flanges on rims, because bead flanges 180 and 184 do not have the sudden step or hook shape of other bead flanges in the industry. Thus bead flanges 180, 184 have a smoother shape, that do not have the sudden change in transition that step-shaped bead flanges, and hook-shaped bead flanges have. This smoother shape leads to less leakage. Second bead flange 184 has a first radius 400, second radius 404, and third radius 408. The bead flange 184 has a height 412. The bead flange extends out past the inner wall of the rim by a width 416. In one embodiment, first radius 400 may be about 2.5 millimeters (mm), second radius 404 may be about 0.8 mm, third radius 408 may be about 1.5 mm, bead flange height 412 may be about 3.57 mm, and bead flange extending width 416 may be about 0.6 mm. In other embodiments, second bead flange 184 may also have a fourth radius 420, and a fifth radius 424. In one embodiment, fourth radius 420 may be about 1 mm, and fifth radius 424 may be about 0.8 mm. First bead flange 180 is generally a mirror image of second bead flange 184.

FIG. 21 is a cross-sectional view of another embodiment of a double walled rim 148.

FIG. 22 is a close-up view of the second bead flange 184 from FIG. 21. Second bead flange 184 has a first radius 400, second radius 404, and third radius 408. The bead flange 184 has a height 412. The bead flange extends out past the inner wall of the rim by a width 416. In one embodiment, first radius 400 may be about 1 mm, second radius 404 may be about 1 mm, third radius 408 may be about 0.5 mm, bead flange height 412 may be about 2.37 mm, and bead flange extending width 416 may be about 0.9 mm. In this embodiment, second bead flange 184 may also have a fifth radius 424, but not a fourth radius 420 (compared to the bead flange in FIG. 20 which has a fourth radius 420). Rather, this embodiment has a sixth radius 428. In one embodiment, fifth radius 424 may be about 1 mm, and sixth radius 428 may be about 2 mm. First bead flange 180 is generally a mirror image of second bead flange 184.

The present invention takes advantage of this geometry to provide an arrangement whereby a rim sealing strip may have a have greater strength and stiffness in a lateral middle region of the tire interface contour to overlap the spoke access holes, while having greater flexibility, ductility, and conformability in the laterally outward regions straddling this middle region. Thus, the middle region has the requisite strength, stiffness, puncture and cut resistance, etc. to effectively bridge the spoke access holes and prevent rupturing and damage to the sealing strip, while the laterally outward regions have the requisite conformability to provide accurate and predictable bead sealing surfaces for reliable bead sealing with the tire.

The present invention provides a rim sealing strip with extra reinforcement in the middle region to provide this greater strength and stiffness and lesser reinforcement in the laterally outward regions to provide this greater conformability. The reinforcement of this middle region may be achieved by a variety of means: Firstly, the middle region and outboard regions may be composed of differing materials, with a first material having the desirable characteristics for the middle region and a second material having the desirable characteristics for the outboard regions. Secondly, the middle region may have an increased thickness relative to the outboard regions, with the increased thickness resulting in increased strength and/or stiffness properties. Thirdly, the middle region may be composed of additional radially stacked layer(s) of material in comparison with the outboard region, with the additional layer(s) providing increased strength and stiffness properties. Fourthly, two or more of the aforementioned means may be combined to optimize the properties of the rim sealing strip.

Further, in conjunction with this rim sealing strip, the present invention may provide for a mating rim with an external tire bed surface that includes geometry tailored to accommodate any thickness variation of the rim sealing strip. More specifically, this rim includes a radially inwardly recessed channel that generally extends circumferentially around the tire bed surface and is laterally positioned to overlap the spoke access holes and to correspond to the middle portion of the rim sealing strip. In one embodiment, this channel does not extend laterally outwardly to the bead sealing surfaces, most particularly for ETRTO dimensional rims that necessitate a required inner rim profile contour for the ease of mounting, dismounting and the retention of tires for tubeless use.

The rim sealing strip of the present invention may be provided as a continuous and endless circumferential hoop that is sized for fitment to the external tire bed surface. The rim sealing strip may otherwise be provided in the more conventional form as a linear strip that is circumferentially wrapped around the external tire bed surface.

The rim channel may be laterally flanked by step edges that provide a beneficial visual aid when installing and aligning the rim sealing strip. Further, this channel also provides a predefined mechanical recess for self-aligning nesting with the rim sealing strip during installation. Still further, this channel may provide the requisite relief in geometry to accommodate any variation in thickness of the rim sealing strip such that the resulting tire interface contour is maintained according to a predetermined specification, such as, but not limited to, the ETRTO specification as described hereinabove.

It should be noted that the terms "first", "second", and "third", and the like may be used herein to modify elements performing similar and/or analogous functions. These modifiers do not imply a spatial, sequential, or hierarchical order to the modified elements unless specifically stated.

While the disclosure has been described with reference to several embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiments disclosed as the best mode contemplated for carrying out this disclosure, but that the disclosure will include all embodiments falling within the scope of the appended claims.

What is claimed is:

1. A rim sealing strip comprising:
   a circumferentially elongated rim strip having a radially outwardly facing outboard surface, a radially inwardly facing inboard surface, a first lateral edge and a second lateral edge laterally spaced from the first lateral edge;
   wherein the rim strip includes an overall lateral width between the first lateral edge and the second lateral edge and a radial thickness between the outboard surface and the inboard surface;
   wherein the radial thickness is variable across the lateral width to include a first lateral region having a first radial thickness and a second lateral region having a second radial thickness, wherein the first radial thickness is thicker than the second radial thickness;
   including a radial first transition step between the first lateral region and the second lateral region, the first transition step is laterally inwardly spaced from the first lateral edge by a first lateral offset distance; and
   wherein the rim sealing strip is comprised of a multiplicity of laterally overlapping elongated elements to include a first elongated element and a second elongated element, wherein the second elongated element laterally overlaps the first elongated element in a lateral overlap region.

2. The rim sealing strip of claim 1, wherein the first elongated element is configured to cover at least one of a spoke access hole, a sharp edge, and an unsealed opening in a rim configured for tubeless tires.

3. The rim sealing strip of claim 2, wherein the first elongated element has a generally constant thickness along its circumferential length.

4. The rim sealing strip according claim 1, wherein the first elongated element extends laterally between a first elongated edge and a second elongated edge, wherein the first transition step includes at least a portion of the first elongated edge.

5. The rim sealing strip according claim 4, including a second transition step laterally offset from the first transition step, wherein the second transition step includes at least a portion of the second elongated edge, wherein at least a portion of the first elongated element is radially inboard of the second elongated element.

6. The rim sealing strip according claim 4, wherein the first elongated edge is a square edge.

7. The rim sealing strip according to claim 1, wherein the transition step is in the inboard surface and wherein the outboard surface is generally smooth across the lateral width.

8. The rim sealing strip according to claim 1, including a first of the transition steps is in the inboard surface and a second of the transition steps in the outboard surface.

9. The rim sealing strip according to claim 1, wherein the radial thickness is variable across the lateral width to include a third lateral region having a third radial thickness, wherein the first radial thickness is thicker than the third radial thickness including a second transition step between the first lateral region and the third lateral region.

10. The rim sealing strip according to claim 9, wherein the first transition step and the second transition step laterally straddle the first lateral region.

11. The rim sealing strip according to claim 10, wherein the second radial thickness is generally equal to the third radial thickness.

12. The rim sealing strip according claim 10, wherein the first transition step and the second transition step face generally laterally outwardly and away from each other.

13. The rim sealing strip according to claim 1, wherein the first lateral region is laterally coincident with the overlap region.

14. The rim sealing strip according to claim 1, wherein the lateral width of the second elongated element is greater than the lateral width of the first elongated element, and wherein the second elongated element completely laterally overlaps the first elongated element such that the lateral width of the overlap region is generally equal to the lateral width of the first elongated element.

15. The rim sealing strip according to claim 14, wherein the radial thickness of the first elongated element is greater than the radial thickness of the second elongated element.

16. The rim sealing strip according to claim 14, wherein the second elongated element is comprised of a linear element including a first end portion and a second end portion, and wherein the linear element is circumferentially wrapped such that the first end portion circumferentially overlaps the second end portion in a circumferential overlap region.

17. The rim sealing strip according to claim 14, wherein the first elongated element is laminated to the second elongated element, including an adhesive interface at the lateral overlap region.

18. The rim sealing strip according to claim 1, wherein the radial thickness of the first elongated element is generally constant across its lateral width and wherein the radial thickness of the second elongated element is generally constant across its lateral width.

19. The rim sealing strip according to claim 1, wherein one of: (i) the first elongated element includes at least a portion thereof having at least one of greater material stiffness, greater material cut resistance, and/or greater material hardness than the material of the second elongated element; and (ii) the second elongated element includes at least a portion thereof having at least one of greater material ductility, greater material conformability, and/or greater material pliability than the material of the first elongated element.

20. The rim sealing strip according claim 19, wherein at least a portion of the first elongated element is radially inboard of the second elongated element.

21. The rim sealing strip according to claim 1, wherein the first elongated element is comprised of a continuous circumferential hoop.

22. The rim sealing strip according to claim 1, wherein the first elongated element is comprised of a continuous circumferential hoop and the second elongated element is comprised of a linear element including a first end portion and a second end portion, and wherein the linear element is circumferentially wrapped such that the first end portion circumferentially overlaps the second end portion.

23. The rim sealing strip according to claim 1, wherein the first elongated element includes adhesive on its radially inboard surface.

24. The rim sealing strip according to claim 1, wherein the second elongated element includes adhesive on its radially inboard surface.

25. The rim sealing system of claim 1, wherein a lateral edge of the first elongated element is configured to be laterally adjacent to a first step edge in a tire bed surface of a mating rim.

26. The rim sealing strip according claim 1, wherein the rim sealing strip is configured to provide a bead sealing surface in a rim configured for tubeless tires, with the bead sealing surface laterally outboard of the first transition step.

27. The rim sealing strip according claim 1, wherein the first elongated element is configured to be nested within a channel of a mating rim, with at least a portion of the second elongated element radially outboard of the first elongated element and extending laterally outboard of the channel.

28. A rim sealing system comprising:
a circumferentially elongated rim strip having a radially outwardly facing outboard surface, a radially inwardly facing inboard surface, a first lateral edge and a second lateral edge laterally spaced from the first lateral edge;
a rim to receive the circumferentially elongated rim strip, wherein the rim includes a radially outwardly projecting first bead flange, a radially outwardly projecting second bead flange laterally spaced from the first bead flange, and a radially outwardly facing tire bed surface positioned laterally between the first bead flange and the second bead flange, and wherein the inboard surface of the rim strip circumscribes the tire bed surface;
wherein the rim strip includes an overall lateral width between the first lateral edge and the second lateral edge and a radial thickness between the outboard surface and the inboard surface;
wherein the radial thickness is variable across the lateral width to include a first lateral region having a first radial thickness and a second lateral region having a second radial thickness, wherein the first radial thickness is thicker than the second radial thickness, including a radical first transition step between the first lateral region and the second lateral region, the first transition step is laterally inwardly spaced from the first lateral edge by a first offset distance;
wherein the tire bed surface includes a circumferential channel, comprising an offset surface that is radially inwardly offset from the remainder of the tire bed surface and that is laterally flanked by a circumferential first step edge;
wherein the first lateral region is nested in the channel such that the first step edge provides lateral alignment registration and visual alignment and placement of the first transition step, and the second lateral region extends laterally outwardly of the channel to span across the first step edge;
wherein the rim strip comprised of a multiplicity of laterally overlapping elongated elements to include a first elongated element and a second elongated element, wherein the second elongated element laterally overlaps the first elongated element in a lateral overlap region.

29. The rim sealing system according to claim 28, wherein the tire bed surface includes an unsealed feature therein wherein the unsealed feature includes at least one of a sharp edge, a gap, and a hole therein and wherein the rim strip extends to radially outwardly cover the unsealed feature.

30. The rim sealing system according to claim 29, wherein the rim strip extends to radially outwardly cover the unsealed feature within the first lateral region.

31. The rim sealing system according to claim 28, wherein the rim is adapted to a tubeless tire interface; wherein the tire bed includes a radially inboard well surface that is radially inboard of and laterally flanked by a first bead seat surface and a second bead seat surface; wherein the first bead seat surface is laterally adjacent the first bead flange and the second bead seat surface is laterally adjacent the second bead flange; and wherein the rim strip extends to laterally overlap the first bead seat surface and the second bead seat surface.

32. The rim sealing system according to claim 31, including a tubeless tire fitted to the rim, wherein the tire includes a first bead and a second bead, wherein the rim strip extends laterally to provide a first bead sealing surface for pneumatic sealing with the first bead and to provide a second bead sealing surface for pneumatic sealing with the second bead.

33. The rim sealing system according to claim 28, wherein at least a portion of the rim strip is adhered to the tire bed at an adhesive interface.

34. The rim sealing system according to claim 28, wherein the first transition step has a radial transition dimension, wherein the step edge has an offset dimension, wherein the radial transition dimension is generally equal to the offset dimension.

35. The rim sealing system of claim 28, wherein the rim is a bicycle rim, wherein at least a portion of the first elongated element is radially inboard of the second elongated element with the first elongated element nested in the channel, the radially outwardly facing surface of the rim strip constitutes at least a portion of a tire interface contour configured to interface with a tubeless tire.

36. The rim sealing system of claim 28, wherein the radial thickness of the first elongated element is larger than the radial thickness of the second elongated element; at least a portion of the first elongated element is radially inboard of the second elongated element.

37. The rim sealing system of claim 28 wherein the radial thickness of the first elongated element is equal to or less than the radial thickness of the second elongated element.

38. The rim sealing system of claim 28, wherein the first elongated element is formed as a linear strip that is configured to wrap circumferentially around the tire bed surface such that its two ends are circumferentially overlapping; and wherein at least a portion of the first elongated element is radially inboard of the second elongated element.

39. The rim sealing system of claim 28, wherein the first elongated element is formed as a circumferential hoop that is configured to wrap circumferentially around the tire bed surface; and wherein at least a portion of the first elongated element is radially inboard of the second elongated element.

40. The rim sealing system according to claim 28, wherein the offset surface is laterally flanked between the first step edge and a circumferential second step edge laterally offset from the first step edge, wherein at least a portion of the first elongated element is radially inboard of the second elongated element, wherein the first elongated element extends laterally between a first elongated edge and a second elongated edge, wherein the first elongated edge is adjacent the first step edge and the second elongated edge is adjacent the second step edge.

41. The rim sealing system according claim 40, wherein the first step edge provides lateral alignment registration and/or visual alignment and placement of the first elongated edge and/or the second step edge provides lateral alignment registration and/or visual alignment and placement of the second elongated edge.

42. The rim sealing system according claim 40, wherein at least a portion of the first elongated element is radially inboard of the second elongated element, wherein the second elongated element laterally overlaps both the first elongated element and the tire bed surface such that the radially outward facing surface of the second elongated element is generally smooth and consistent at the laterally adjacent interface between first elongated edge and the first step edge.

43. The rim sealing system according claim 28, wherein the first elongated element extends laterally between a first elongated edge and a second elongated edge, wherein the first transition step includes at least a portion of the first elongated edge and wherein the first elongated edge is a generally square edge, and wherein at least a portion of the first elongated element is radially inboard of the second elongated element.

44. The rim sealing system according claim 43, wherein the thickness of the first elongated element is generally constant across its lateral width, wherein the radial transition dimension is generally equal to the thickness of the first elongated element.

45. The rim sealing system according claim 28, wherein the first elongated element extends laterally between a first elongated edge and a second elongated edge, wherein the first transition step includes at least a portion of the first elongated edge and wherein the radial thickness of the first elongated element is generally constant along its lateral width between the first elongated edge and the second elongated edge, and wherein at least a portion of the first elongated element is radially inboard of the second elongated element.

46. The rim sealing system according claim 28, wherein the first lateral region is laterally coincident with the overlap region.

47. The rim sealing system according claim 28, wherein the first lateral region contacts the offset surface.

48. A rim sealing strip comprising:
a circumferentially elongated rim strip having a radially outwardly facing outboard surface, a radially inwardly facing inboard surface, a first lateral edge and a second lateral edge laterally spaced from the first lateral edge;
wherein the rim strip includes an overall lateral width between the first lateral edge and the second lateral edge and a radial thickness between the outboard surface and the inboard surface; and
wherein the rim strip includes a first lateral region having a first lateral width and a second lateral region having a second lateral width, the second lateral region is laterally adjoining the first lateral region;
wherein the second lateral region extends laterally outwardly from the first lateral region by a lateral offset distance; and
wherein at least one of: (i) the first lateral region includes at least a portion thereof having at least one of greater material stiffness, greater material hardness; and/or greater material cut resistance than the material of the second lateral region; and (ii) the second lateral region includes at least a portion thereof having at least one of greater material ductility, greater material conformability, and/or greater material pliability than the material of the first lateral region.

49. The rim sealing strip according to claim 48, wherein the rim strip is comprised of a singular monolithic elongated element to include the first lateral region and the second lateral region.

50. The rim sealing strip according to claim 48, including a rim to receive the rim strip, wherein the rim includes a radially outwardly projecting first bead flange and a radially outwardly projecting second bead flange laterally spaced from the first bead flange and a radially outwardly facing tire bed surface positioned laterally between the first bead flange and the second bead flange, wherein the inboard surface of the rim strip circumscribes the tire bed surface, and wherein the tire bed surface includes an unsealed opening there through to communicate to the atmosphere, and wherein the first lateral region extends to cover the unsealed opening.

51. The rim sealing system according claim 48, wherein the rim strip is configured to laterally span between a first bead seat surface and a second bead seat of a rim configured for tubeless tires.

52. The rim sealing system according claim 48, wherein the rim strip is comprised of a multiplicity of laterally overlapping elongated elements to include a first elongated element and a second elongated element, wherein the second elongated element laterally overlaps the first elongated element in a lateral overlap region, wherein the first elongated element is radially inboard of the second elongated element, wherein one of: (i) the first elongated element includes at least a portion thereof having at least one of greater material stiffness, greater material cut resistance, and/or greater material hardness than the material of the second elongated element; and (ii) the second elongated element includes at least a portion thereof having at least one of greater material ductility, greater material conformability, and/or greater material pliability than the material of the first elongated element.

53. The rim sealing system according claim 48, Including a transition step between the first lateral region and the second lateral region, wherein the transition step is configured to provide lateral alignment registration and visual alignment and placement of a step edge of a rim adapted to a tubeless tire.

\* \* \* \* \*